(12) United States Patent
Muramatsu

(10) Patent No.: US 8,180,179 B2
(45) Date of Patent: May 15, 2012

(54) IMAGE PROCESSING APPARATUS, IMAGE PROCESSING METHOD, PROGRAM EXECUTING IMAGE PROCESSING METHOD, AND STORAGE MEDIUM

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 12/340,308

(22) Filed: Dec. 19, 2008

(65) Prior Publication Data

US 2009/0161169 A1     Jun. 25, 2009

(30) Foreign Application Priority Data

Dec. 21, 2007  (JP) ................................ 2007-330978
Dec. 15, 2008  (JP) ................................ 2008-318563

(51) Int. Cl.
*G06K 9/32* (2006.01)
(52) U.S. Cl. ...................................................... 382/299
(58) Field of Classification Search ............. 348/208.13, 348/333.11, E13.017, E11.013; 382/299
See application file for complete search history.

(56) References Cited

U.S. PATENT DOCUMENTS

| 2007/0146511 A1 | 6/2007 | Kinoshita et al. |
| 2008/0131028 A1 | 6/2008 | Pillman et al. |
| 2009/0168128 A1 | 7/2009 | Matsuzaki |

FOREIGN PATENT DOCUMENTS

| JP | 2006-092450 | * | 4/2006 |
| JP | 2006-092450 A | | 4/2006 |

OTHER PUBLICATIONS

Aoki, Shin. "Super Resolution Processing by Plural Number of Lower Resolution Images". Ricoh Technical Report No. 24, Nov. 1998, pp. 19-25.

* cited by examiner

*Primary Examiner* — Gregory F Cunningham
(74) *Attorney, Agent, or Firm* — Canon USA, Inc., IP Division

(57) ABSTRACT

An image processing apparatus including an area sensor unit reading image data items corresponding to frames from an original image, a correction unit correcting the inclinations of the image data items, a high-resolution conversion unit acquiring image data with a resolution higher than the pixel sensor's resolution through interpolation, a maximum frame number storage unit storing data of the maximum number of frames of the acquired image data items, a resolution setting unit setting a resolution for outputting the original image, a necessary frame number acquisition unit acquiring the number of frames necessary to perform the high resolution conversion based on the setting result, a read frequency calculation unit calculating the frequency of reading the original image through the necessary frame number acquisition unit and the maximum frame number storage unit, and a read frequency control unit reading the determined frequency and the original image is provided.

28 Claims, 25 Drawing Sheets

| | OUTPUT RESOLUTION | | | | | |
|---|---|---|---|---|---|---|
| | 100 dpi | 200 dpi | 300 dpi | 600 dpi | 1200 dpi | 2400 dpi |
| NECESSARY FRAME NUMBER | 1 | 4 | 10 | 40 | 100 | 400 |

◇ PIXEL OF OBJECT-RESOLUTION IMAGE

● PIXEL FOR SUPER RESOLUTION PROCESSING

IMAGE PROCESSING APPARATUS, IMAGE PROCESSING METHOD, PROGRAM EXECUTING IMAGE PROCESSING METHOD, AND STORAGE MEDIUM

BACKGROUND OF THE INVENTION

1. Field of the Invention

The present invention relates to an image processing apparatus, a method of controlling the image processing apparatus, and a program executing the image processing method, a storage medium program, and a storage medium.

2. Description of the Related Art

The technology referred to as "super-resolution processing and super resolution conversion", which allows for increasing a resolution by using image data with a predetermined resolution by as much as a plurality of frames, has been available. The use of the above-described technology allows for converting a low-resolution image into a high-resolution image and obtaining a high-resolution image through a known device ("Super Resolution Processing by Plural Number of Lower Resolution Images" (Ricoh Technical Report No. 24, November 1998)).

For performing the super-resolution technology, data items of an original image should be prepared, the image data items corresponding to a plurality of frames. The original-image reading positions of the individual image data items are a little different from one another on a scale measured in sub pixels (the sub pixel is smaller than a single pixel). Therefore, the super-resolution technology is widely used in the area of video processing or the like.

However, for performing the super-resolution processing, image data should be prepared by as much as a plurality of frames, so as to generate the image corresponding to a single pixel of a high-resolution image. Consequently, the data amount and the calculation amount are increased.

In the past, therefore, the number of frames for which the super-resolution processing is performed is determined based on the size of an image area of interest so that the calculation amount is decreased, as disclosed in Japanese Patent Laid-Open No. 2006-092450.

However, the number of images for which the super-resolution processing is performed is determined only for the area of interest according to the above-described known technology. Therefore, the number of frame-image data items that should be prepared for performing the super-resolution processing should be obtained on the entire image area in advance.

Further, when the super-resolution processing is used for a multifunction peripheral (MFP) which is an image processing apparatus, line sensors are usually used as a reader provided in the MFP, a scanner, and so forth.

That is to say, a single read frame is obtained through a single read operation. According to the above-described reader, an original image is read through groups of pixel sensors that are horizontally arranged in the main scanning direction with distances therebetween, the value of each of the distances corresponds to an integer multiple of the pixel. It is difficult for the above-described reader to read the original image while providing shifts that are as small as a sub pixel between the positions where the original image is read in the main scanning direction.

Therefore, an area sensor is installed in the image processing apparatus, so as to be inclined from a reference installation position, frame image data can be acquired through a single read operation, while the positions of pixels for reading are little shifted from one another in the main scanning direction and/or the sub scanning direction. In that case, however, low-resolution frame image data corresponding to a plurality of read frames is used irrespective of conditions for outputting image data. Therefore, it is often difficult to reproduce an output image with a demanded quality based on the read low-resolution frame image data.

SUMMARY OF THE INVENTION

Accordingly, the present invention provides an image processing apparatus and an image processing method used for the image processing apparatus, so as to respond to a demand for the output image quality and achieve the super-resolution processing.

Therefore, an image processing apparatus according to an aspect of the present invention includes an area sensor unit configured to read image data items corresponding to a plurality of frames from an original image, the image data items having at least one shift corresponding to less than a single pixel, a correction unit configured to correct the inclination of each of the image data items acquired through the area-sensor unit, a high-resolution conversion unit configured to acquire image data with a resolution higher than that of a pixel sensor by performing interpolation processing by using the corrected image data items, a maximum frame number storage unit configured to store data of the maximum number of at least one frame of the image data items acquired through the area sensor unit, a resolution setting unit configured to set a resolution used to output the original image, a necessary frame number acquisition unit configured to acquire a number of at least one frame necessary to perform the high resolution conversion based on a result of the setting made by the resolution determining unit, a read frequency calculation unit configured to calculate a frequency of reading the original image through the necessary frame number acquisition unit and the maximum frame number storage unit, and a read frequency control unit configured to read the frequency determined by the read frequency calculation unit and the original image.

The present invention allows for acquiring low-resolution frame image data necessary to perform the super-resolution processing in response to a demand for an output image quality and outputting a high-resolution image reproduced with difficulty through a single read operation.

Further features of the present invention will become apparent from the following description of exemplary embodiments with reference to the attached drawings.

DESCRIPTION OF THE EMBODIMENTS

A first embodiment of the present invention will be described. In the first embodiment, a method of generating a high-resolution image by using an area sensor will be described, where the method is provided for an image processing apparatus including a color scanner.

Appearance of Image Processing Apparatus

Figure 1:
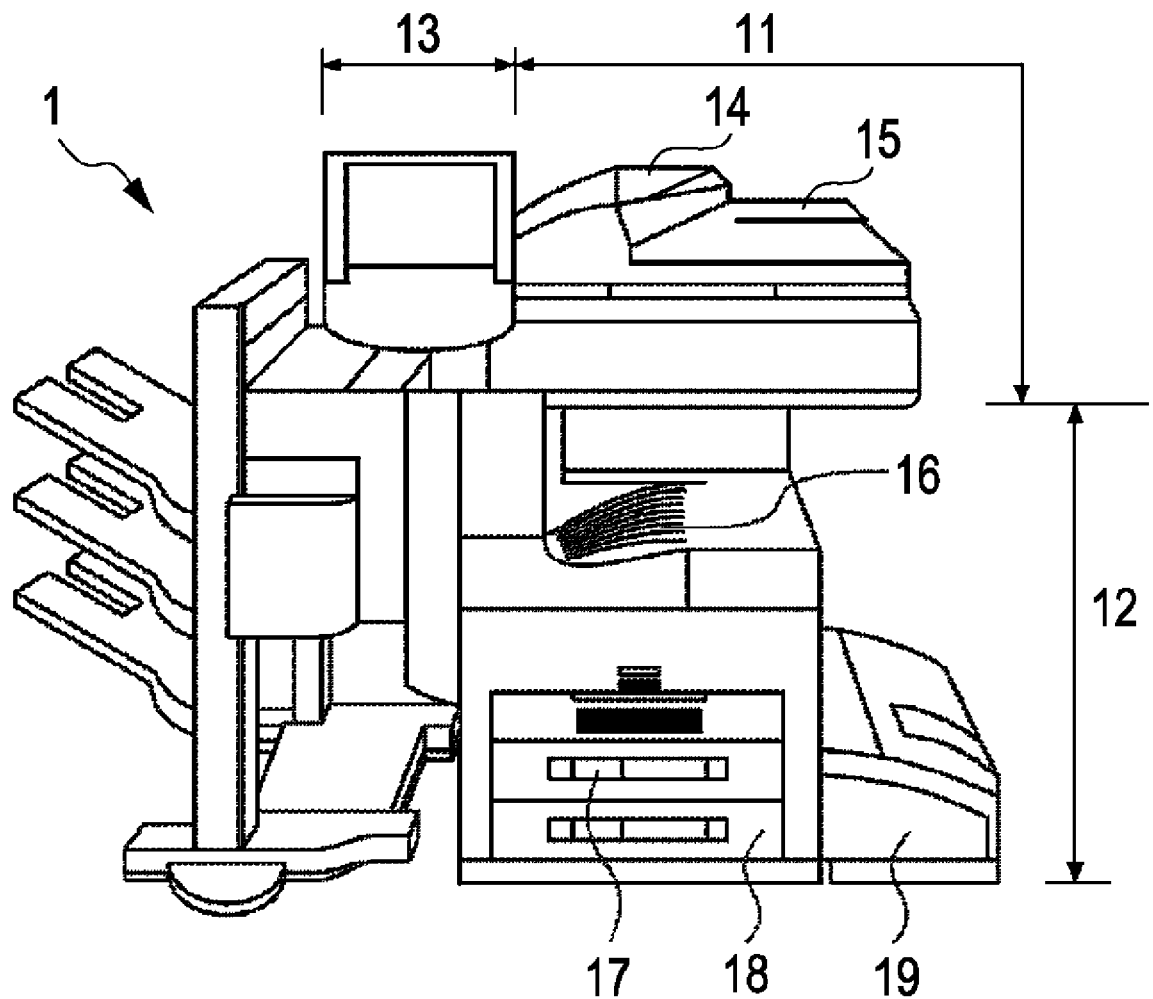
FIG. 1 is an outline drawing of an image processing apparatus.

FIG. 1 shows the appearance of an image processing apparatus 1. The image-processing apparatus 1 is divided into a scanner unit 11 reading an original image, a printer unit reproducing read image data, and an operation unit 13 specifying various operation settings of the image-processing apparatus 1. The scanner unit 11 converts information about the original image into an electric signal by transmitting reflected light obtained by exposing and scanning an image shown on the original image to a charge coupled device (CCD). Further, the scanner unit 11 converts the electric signal into brightness signals of red (R), green (G), and blue (B), and transmits the brightness signals to a controller 20 which will be described later with reference to FIG. 3, as image data.

Here, the original image is placed in a tray 14 of an original feeder 15. When a user instructs to start reading data from the operation unit 13, the controller 20 transmits an original-image-read instruction to the scanner 11. Upon receiving the original-image-read instruction, the scanner unit 11 feeds original images one at a time from the tray 14 of the original feeder 15 and performs a read operation for the original image. Here, the method of reading the original image may be a system of placing the original image on the surface of a glass plate (not shown) and moving an exposure unit so that the original image is scanned instead of an automatic-feeding system achieved by the original feeder 15.

The printer unit 12 is an image processing apparatus forming the image data transmitted from the controller 20 on a sheet. Here, even though an image-processing system used in the first embodiment is an electrophotography system using a photoconductive drum and/or a photoconductive belt, the present invention can be achieved by using another system without being limited to the above-described electrophotography system. For example, an inkjet system which allows for discharging ink from a micro-nozzle array and printing data on a sheet may be used. Here, the printer unit 12 is provided with a plurality of sheet cassettes 17, 18, and 19 which allows for making selections from different sheet sizes and/or different sheet orientations. After printing is finished, the sheet is discharged into a discharge tray 16.

(Configuration of Read Unit of Image Processing Apparatus)

Figure 2:
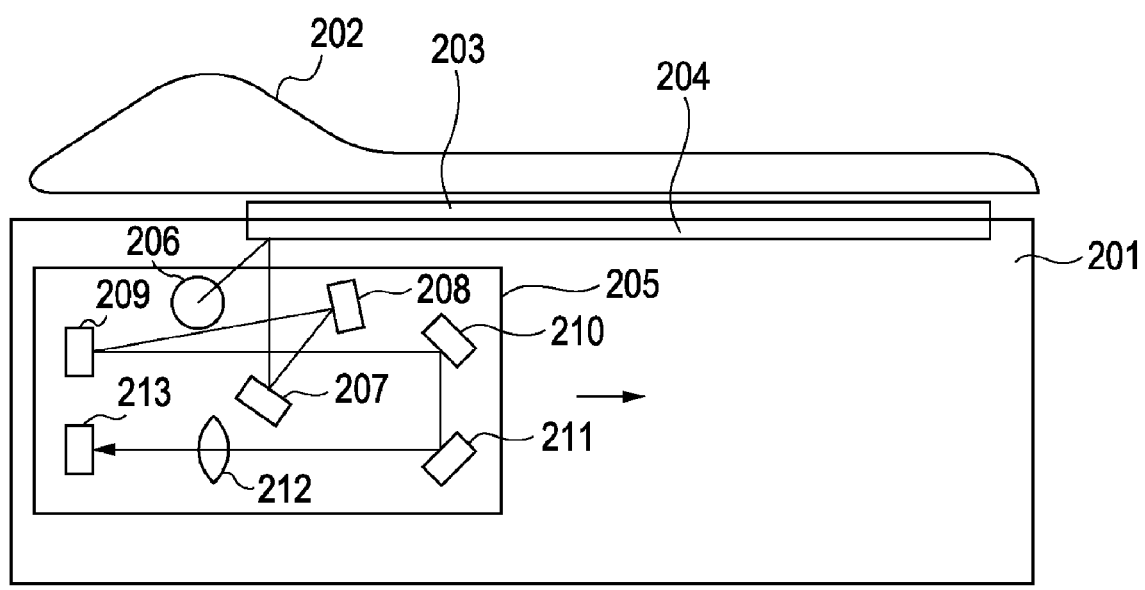
FIG. 2 shows the configuration of a read unit of the image processing apparatus.

FIG. 2 shows an exemplary image read unit of an MFP using the above-described embodiment. FIG. 2 shows a reader main body 201 and an automatic-original feeder 202 holding an original image 203 and transferring the original image to an original-read position when moving-original reading is performed. FIG. 2 also shows a glass plate, that is, an original plate 204 on which the original image 203 is placed when original-plate reading is performed.

FIG. 2 also shows a read unit 205 including a read device reading the original image 203, a device picking up the original image 203, a light source 206 including a white-light source such as a xenon tube, and mirrors 207, 208, 209, 210, and 211. When the original image 203 is irradiated with light transmitted from the light source 206, the light reflected from the original image is transferred to an image-pickup element 213 by the mirrors 207 to 211. FIG. 2 also shows a lens 212 condensing the light that is reflected from the original image and that is reflected from the mirror 211 to the width of the image-pickup element 213.

Detailed Description of Controller

Figure 3:
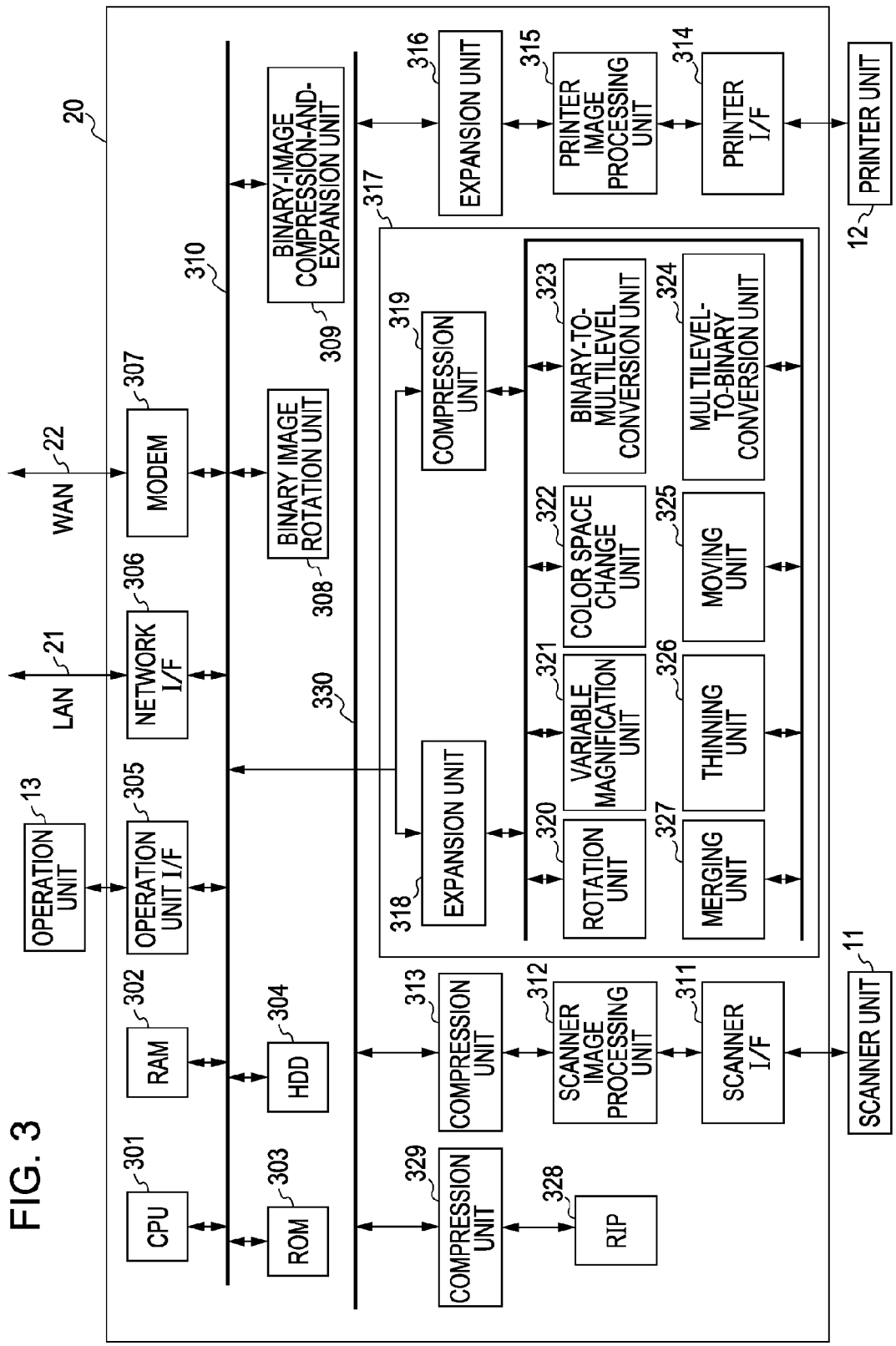
FIG. 3 is a block diagram describing the configuration of a controller provided in the image-processing apparatus.

FIG. 3 is a block diagram describing the configuration of a controller 20 provided in the image-processing apparatus 1 in more detail.

The controller 20 is electrically connected to the scanner unit 11 and the printer unit 12. On the other hand, the controller 20 is connected to an external device or the like via a local-area network (LAN) 21 and/or a wide-area network (WAN). Consequently, image data and/or device information can be input and/or output.

A CPU 301 has control over access to various devices to which the controller 20 is currently connected based on a control program or the like stored in a read-only memory (ROM) 303. Further, the CPU 301 has control over various processing procedures performed in the controller 20.

A random-access memory (RAM) 302 is a system-work memory provided so that the CPU 301 can operate and is a memory provided to temporarily store image data. The above-described RAM 302 includes a static RAM (SRAM) that retains stored data after the power is turned off and a dynamic RAM (DRAM) from which stored data is deleted after the power is turned off.

The ROM 303 stores a boot program or the like of the image-processing apparatus 1. A hard disk drive (HDD) 304 can store system software and/or image data.

An operation-unit interface (I/F) 305 is provided to connect a system bus 310 to an operation unit 13. The above-described operation-unit I/F 305 receives image data which is to be displayed on the operation unit 13, the image data being transmitted from the system bus 310, and transmits the image data to the operation unit 13, and transmits information transmitted from the operation unit 13 to the system bus 310.

A network I/F 306 is connected to the LAN 21 and the system bus 310, so as to input and output information. A modem 307 is connected to the WAN 22 and the system bus 310, so as to input and output information. A binary-image-rotation unit 308 changes the orientation of image data before the image data is transmitted. A binary-image-compression-and-expansion unit 309 changes the resolution of the image data to a predetermined resolution and/or a resolution fitted to the capacity of the transmission destination before the image data is transmitted. When the image data is compressed and/or expanded, the Joint Bi-level Image Experts Group (JBIG) system, the Modified Modified Read (MMR) system, the Modified Read (MR) system, the Modified Huffman (MH) system, and so forth are used. An image bus 330 is a transmission path provided to transmit and/or receive image data and includes a Peripheral Components Interconnect (PCI) bus and/or an Institute of Electrical and Electronic Engineers (IEEE) 1394.

A scanner-image-processing unit 312 corrects, processes, and edits image data transmitted from the scanner unit 11 via a scanner I/F 311. Here, the scanner-image-processing unit 312 determines to which of a color document, a monochrome document, a text document, a photo document, and so forth the transmitted image data corresponds. Then, the scanner-image-processing unit 312 attaches information about a result of the above-described determination to the image data. The above-described attached information is referred to as attribute data. Details of processing procedures performed in the scanner-image-processing unit 312 will be described below.

A compression unit 313 receives and divides the image data into 32 pixel by 32 pixel blocks. Here, the 32 pixel by 32 pixel-image data is referred to as tile data. The area corresponding to the above-described tile data, the area being shown on an original (a paper medium before being read), is referred to as a tile image. Further, information about the average brightness of the 32 pixel by 32 pixel block and the positions of the coordinates of the tile image on the original is added to the tile data as header information. Further, the compression unit 313 compresses image data including a plurality of the tile-data items. An expansion unit 316 expands the image data including the plurality of tile-data items, and performs raster development of the image data. Then, the expansion unit 316 transmits the image data to a printer-image-processing unit 315.

The printer-image-processing unit 315 receives the image data transmitted from the expansion unit 316, and performs image processing for the image data while referring to the attribute data attached to the image data. The image data that had been subjected to the image processing is transmitted to the printer unit 12 via a printer I/F 314. Details of processing procedures performed in the printer-image-processing unit 315 will be described below.

An image-change unit 317 performs predetermined change processing for the image data. The image-change unit 317 includes units shown below.

An expansion unit 318 expands image data transmitted thereto. A compression unit 319 compresses image data transmitted thereto. A rotation unit 320 rotates image data transmitted thereto. A variable-magnification unit 321 performs resolution-change processing (e.g., from 600 dpi to 200 dpi) for image data transmitted thereto. A color-space-change unit 322 changes the color space of image data transmitted thereto. The color-space-change unit 322 can perform known background-eliminating processing, known logarithmic (LOG) transformation processing (RGB→CMY), known output-color-correction processing (CMY→CMYK), and so forth by using a matrix and/or a table. A binary-to-multilevel-conversion unit 323 converts two-level image data transmitted thereto into 256-level image data. A multilevel-to-binary-conversion unit 324 converts 256-level image data transmitted thereto into two-level image data by using a system including error-diffusion processing or the like.

A merging unit 327 generates a single image-data item by merging two image-data items transmitted thereto with each other. When the two image-data items are merged with each other, one or more of the following methods may be used, for example, to determine the merge-brightness value of a pixel. The merge-brightness value of the pixel refers to the brightness value of the pixel after the merging. The methods include the method of determining the average brightness value of the pixels which are to be merged with one another to be the merge-brightness value of the pixel, the method of determining the highest brightness value among the pixels which are to be merged with one another to be the merge-brightness value of the pixel, and the method of determining the lowest brightness value among the pixels which are to be merged with one another to be the merge-brightness value of the pixel. Further, a method of determining the brightness values used after the merging by performing OR operation, AND operation, exclusive OR operation, and so forth for the pixels which are to be merged with one another may also be used. Each of the above-described merging methods is widely known. A thinning unit 326 performs resolution conversion by thinning out the pixels of image data transmitted thereto, and generates the image data corresponding to one second, one fourth, one eighth, and so forth of the image data transmitted to the thinning unit 326. A moving unit 325 adds and/or deletes a margin to and/or from image data transmitted thereto.

A raster image processor (RIP) 328 receives intermediate data generated based on Page Description Language (PDL) code data transmitted from a print server (not shown) or the like, generates bitmap data (multilevel), and compresses the bitmap data through a compression unit 329.

Detailed Description of Scanner-Image-Processing Unit 312

Figure 4:
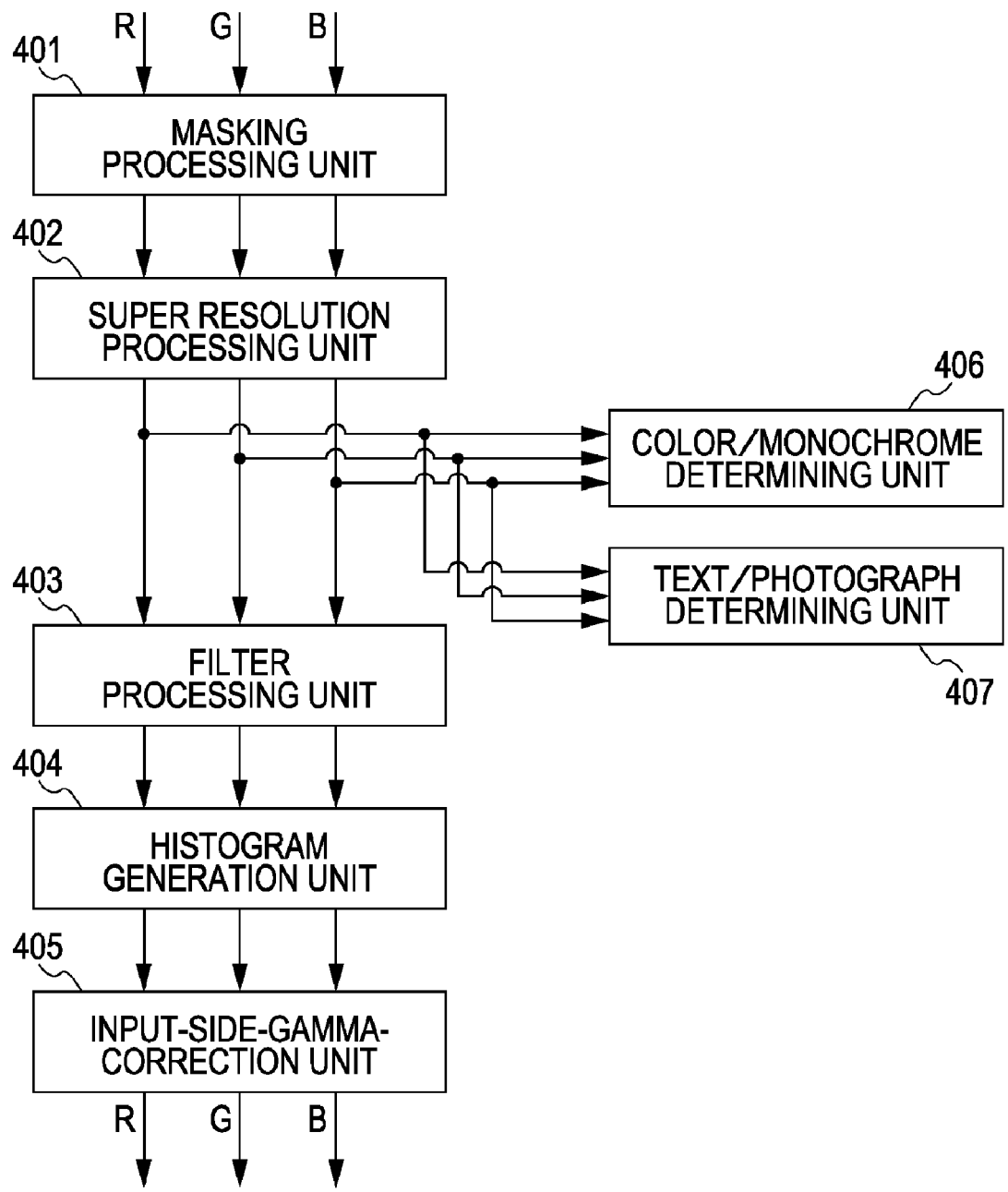
FIG. 4 is a block diagram showing the internal configuration of a scanner-image-processing unit.

FIG. 4 shows the internal configuration of the scanner-image-processing unit 312. The scanner-image-processing unit 312 receives image data including RGB brightness signals, where each of the signals is an 8-bit signal, transmitted from the scanner unit 11 via the scanner I/F 311. The brightness signal is converted into a standard brightness signal independent of the filter color of the CCD through a masking-processing unit 401.

A filter-processing unit 403 arbitrarily corrects the space frequency of image data transmitted thereto. The filter-processing unit 403 performs calculation processing for the image data transmitted thereto by using a 7- by 7-pixel matrix, for example. Incidentally, in the case where a copying machine is used, the user of the copying machine can select text mode, photo mode, or text/photo mode, as copy mode by operating the operation unit 13. If the text mode is selected by the user under the above-described circumstances, the entire image data is text-filtered through the filter-processing unit 403. Further, if the photo mode is selected, the entire image data is photo-filtered. Still further, if the text/photo mode is selected, the filter-processing unit 403 switches between the filters adaptively for each pixel in accordance with a text/photo determining signal (part of the attribute data) that will be described below. Namely, which of the photo filter and the text filter should be used is determined for each pixel. Further, a coefficient which allows for smoothing high-frequency components only is set to the photo filter so that the roughness of an image is reduced. Still further, a coefficient which allows for performing strong edge emphasizing is set to the text filter so that the sharpness of a character is increased.

A histogram-generation unit 404 samples the brightness data of each of pixels included in image data transmitted thereto. More specifically, brightness data that falls within a rectangular area surrounded by a start point and an end point that are individually specified in the main-scanning direction and the sub-scanning direction is sampled at regular pitches in the main-scanning direction and the sub-scanning direction. Then, the histogram-generation unit 404 generates histogram data based on the sampling result. The generated histogram data is used to estimate the ground level when performing the background-eliminating processing. An input-side-gamma-correction unit 405 converts the histogram data into brightness data having a nonlinear property by using a table or the like.

A color/monochrome-determining unit 406 determines whether each of the pixels included in image data transmitted thereto is chromatic or achromatic, and attaches data of the determination result to the image data, as a color/monochrome-determining signal (part of the attribute data).

A text/photograph-determining unit 407 determines whether each of the pixels included in the image data constitutes a character, a grid of dots, a character shown in the grid of dots, or a solid image based on the values of the individual pixels and the values of pixels surrounding the individual pixels. If the pixel does not constitute any of the character, the grid of dots, the character, and the solid image, the pixel constitutes a white area. Data of the determination result is attached to the image data, as a text/photo-determining signal (part of the attribute data).

A super-resolution-processing unit 402 executes super-resolution processing for image data transmitted thereto. Further, in the case where a copying machine is used, the user of the copying machine can select super-resolution-processing mode by operating the operation unit 13.

Although details on the super-resolution-processing mode will be described later, the super-resolution processing is performed under certain conditions.

First, image data of an original image should be prepared by as much as a plurality of frames, where the positions where the original image is read are a little shifted in the main-scanning direction and/or the sub-scanning direction with reference to image data of the original image read with the sensor resolution of a reader.

Namely, the image data items corresponding to consecutive frames should be prepared, where the positions of a document read by a sensor are a little shifted in the main-scanning direction and/or the sub-scanning direction from the document position of reference image data.

Further, when the image data items corresponding to the frames are read, the amount of the shift of the read position of the original image, the shift existing between image-data items obtained by adjacent sensors, should be less than a single pixel (sub pixel) in the main-scanning direction and/or the sub-scanning direction. The shift of the read position may be a shift of which amount is less than a single pixel, the shift being obtained by subjecting an integral multiple of the position shift to offset correction. Hereinafter, data which is read at the time when an original image including a single screen image (frame) is scanned and which constitutes the original image corresponding to the above-described single screen image (frame) is referred to as "frame-image data". Further, the position of a pixel read on the original image is referred to as a "phase".

Further, a phenomenon in which the phase is shifted is referred to as "phase is shifted", and the shift of the position of a pixel for reading is referred to as a "phase shift".

Further, the value of a low resolution used in the above-described embodiment is not limited to 300 dpi. Namely, the low resolution indicates the resolution of an image output from the image processing apparatus 1 performing ordinary printing.

The main-scanning direction is a direction orthogonal to a direction in which the read unit 205 is moved toward the original image placed on an original plate when the document is read through a scanner. Then, the landscape orientation of the read original image is referred to as the "main-scanning direction", as indicated by an arrow A shown in FIG. 8.

Similarly, the sub-scanning direction is a direction parallel to the direction in which the read unit 205 is moved. Then, the portrait orientation of the read original image is referred to as the "sub-scanning direction", as indicated by an arrow B shown in FIG. 8.

According to the above-described embodiment, an area sensor is placed in a slanting direction, which allows for acquiring a plurality of images of which phases are shifted with reference to the main-scanning direction and the sub-scanning direction for each RGB channel.

Figure 5:
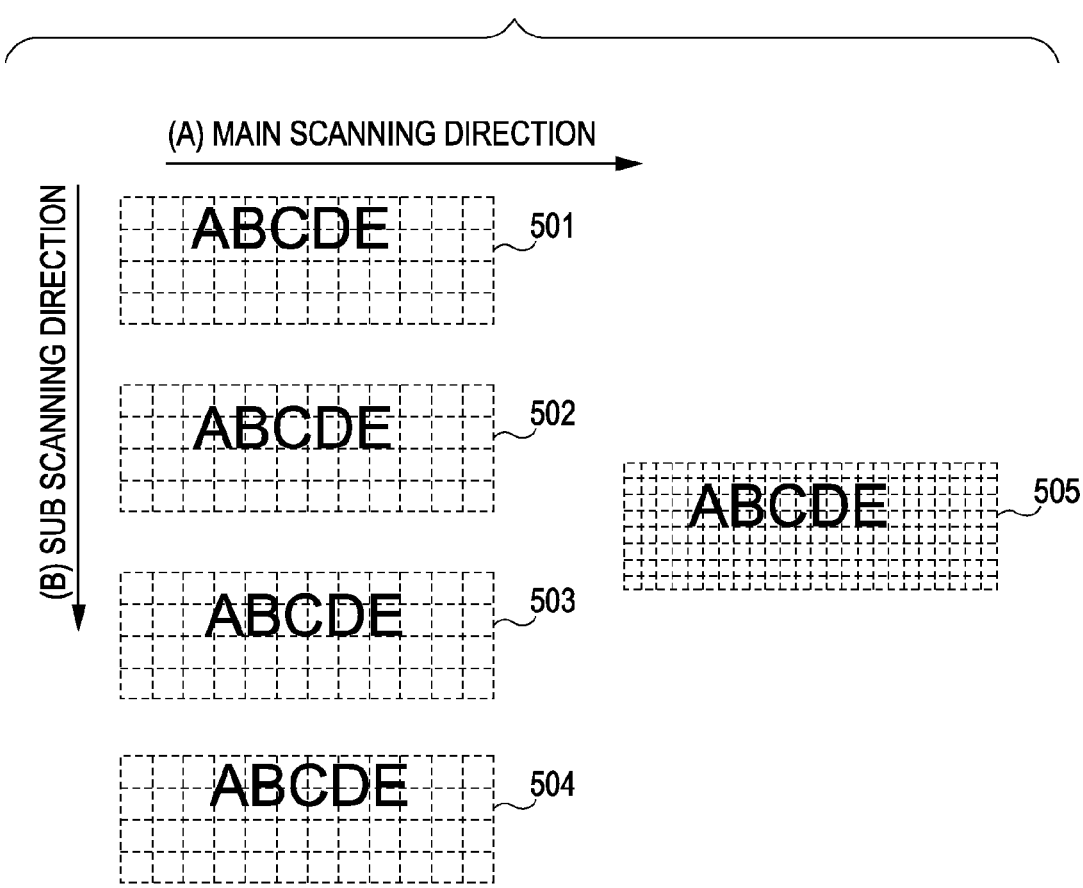
FIG. 5 shows exemplary images obtained through a scanner unit.

FIG. 5 shows exemplary images obtained through the above-described embodiment. The phase of each of acquired images 501, 502, 503, 504, and 505 is shifted with reference to the main-scanning direction and the sub-scanning direction.

(Area Sensor)

In the above-described embodiment, the sensor reading image data is provided as an area sensor. The area sensor is an image-pickup element used for a digital camera or the like. In contrast to the above-described sensor provided for each line, pixel sensors configured to read data are two-dimensionally arranged.

Figure 7:
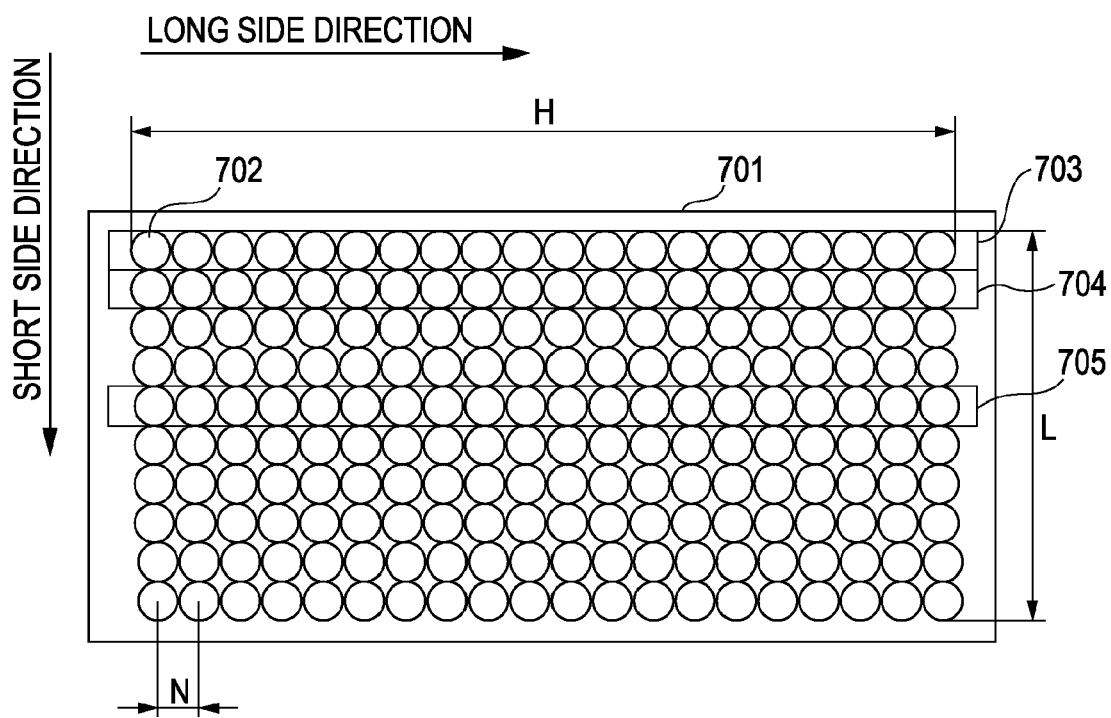
FIG. 7 shows the configuration of an area sensor.

FIG. 7 shows the configuration of the above-described area sensor, that is, an area sensor 701.

The area sensor 701 includes a pixel sensor 702. The pixel sensor 702 includes pixel sensors provided in H pixels arranged in the long-side direction and those provided in L pixel sensors arranged in the short-side direction. Each of the pixels may include a pixel sensor ready for an RGB color image, the pixel sensor being achieved by dividing the pixel sensor of the above-described pixel into four parts. Further, the H pixels may be equivalent to the L pixels (the long side=the short side). The resolution of the area sensor is determined based on the distance N between the pixel sensors.

An area sensor used for a high-resolution digital camera includes a large number of pixels so that the number of pixel sensors arranged in the long-side direction and those arranged in the short-side direction is increased. For example, some of digital cameras including about ten million pixels include 3800 pixels, as pixel sensors arranged in the long-side direction, and 2800 pixels, as pixel sensors arranged in the short-side direction.

Generally, in the case where an area sensor is used for a camera or the like, the area sensor captures and picks up transmitted image data, as data of a two-dimensional area.

Namely, the area sensor picks up image data by using two-dimensionally arranged pixel sensors for a single imaging. When the area sensor is mounted on the reader, the pixel sensors are arranged straight so that picked-up original image data is not distorted in a horizontal direction and a vertical direction.

Consequently, the pixel sensors are arranged so that when the picked-up original image is reproduced, the reproduced image is not shifted in a slanting direction at all.

For example, when the area sensor is installed in an ordinary camera, image data read by pixel sensors arranged on a line indicated by a black frame 703 becomes image data constituting the top end part of a picked-up object image.

At that time, the read image data is not inclined in the direction in which the line is formed.

Similarly, image data read by pixel sensors arranged on a line indicated by a black frame 704 is image data located at a position different from the position of the picked-up object image read in the black frame 703. Namely, the position of the picked-up object image read in the black frame 704 is below the position of the picked-up object image read in the black frame 703 in a vertical direction. Accordingly, image data read by pixel sensors arranged on a line indicated by a black frame 705 is located at a position four pixels below the position of the picked-up object image in a vertical direction, the picked-up object image being read by the pixel sensors provided in the black frame 703.

When using the area sensor of the digital camera in the above-described manner, the image data is picked up as the two-dimensional area. Therefore, all of the pixel sensors constituting the area sensor pick up the picked-up object image from different positions. However, the method of using the area sensor provided in the apparatus used in the above-described embodiment is different from the method of using the area sensor provided in the above-described digital camera.

First, the area sensor shown in FIG. 7 is installed at a reference installation position defined on the reader.

When an original image is placed at a position specified on the original plate 204 shown in FIG. 1, light that is applied from a light source to the original image and that is reflected from the original image is condensed by the sensor, where the light source runs in parallel with the same orientation as the portrait orientation of the original image under the original image. The reflected light is captured so that the reflected light is not inclined toward the sensor. The reflected light acquired as the image data corresponding to a single line by subjecting the light source to the parallel scanning is condensed in parallel with the landscape orientation (the long-side direction) of the sensor shown in FIG. 7.

Therefore, the sensor is installed at a position determined so that the sensor can capture the original image with approximately no inclination.

The above-described installation position at which the sensor is installed, so as to achieve an output of the original image, is referred to as the "reference installation position" of the sensor.

In the following description, the sensor includes the pixel sensors of 20 pixels arranged in the long-side direction and those of 10 pixels arranged in the short-side direction for the sake of simplicity of description. Of course, it may be configured that the number of the pixel sensors arranged in the long-side direction is equivalent to that of the pixel sensors arranged in the short-side direction. Further, the above-described pixel-sensor numbers are determined to describe the use and the configuration of the area sensor of the above-described embodiment, and are not limited to the numbers of the pixel sensors shown in FIG. 7.

In practice, the numbers of the pixel sensors may be the same as those of the pixel sensors used in the digital camera.

The read unit 205 including the image-pickup element 213, that is, the area sensor mounted on the reader is driven in the direction of an arrow shown in FIG. 2 so that the original image 103 placed on the original plate 204 is read.

Namely, the read line sensors 704 and 705, where each of the sensors 704 and 705 is a group of the pixel sensors, are handled, as is the case with the above-described line sensor. Consequently, a read operation is performed.

Figure 8:
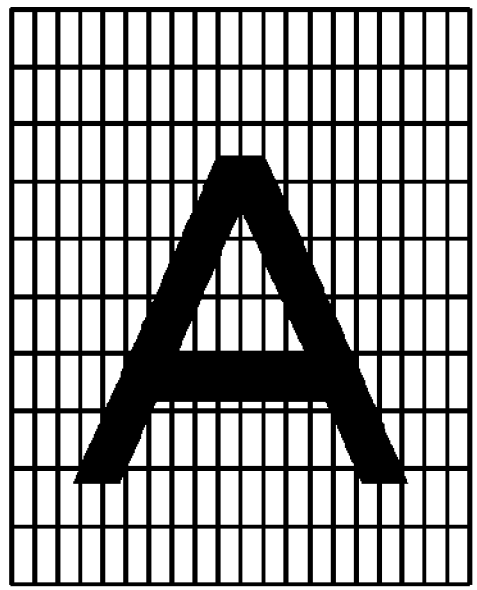
FIG. 8 shows an original image read by the area sensor.

Next, how the image data read by the read line sensors 704 and 705 are handled will be described. FIG. 8 shows an original image read in the following description.

A grid shown in FIG. 8 corresponds to the resolution of pixel sensors included in the read line sensor 704 and/or the read line sensor 705.

At the same time as when the read unit 205 is driven and moved in the sub-scanning direction under the original plate 204, image-data items transmitted to the read line sensors 704 and 705 are read in sequence.

That is to say, part of the document data, the part corresponding to the line width representing the position of the read unit 205, is read every moment.

The process of reading the original image will be described. When the read unit 205 is moved in the sub-scanning direction under the original plate 204, the diagonally shaded areas of the original image shown in part (a) of FIG. 9, part (a) of FIG. 10, part (a) of FIG. 11, and part (a) of FIG. 12 are irradiated with light emitted from the light source.

Figure 9:
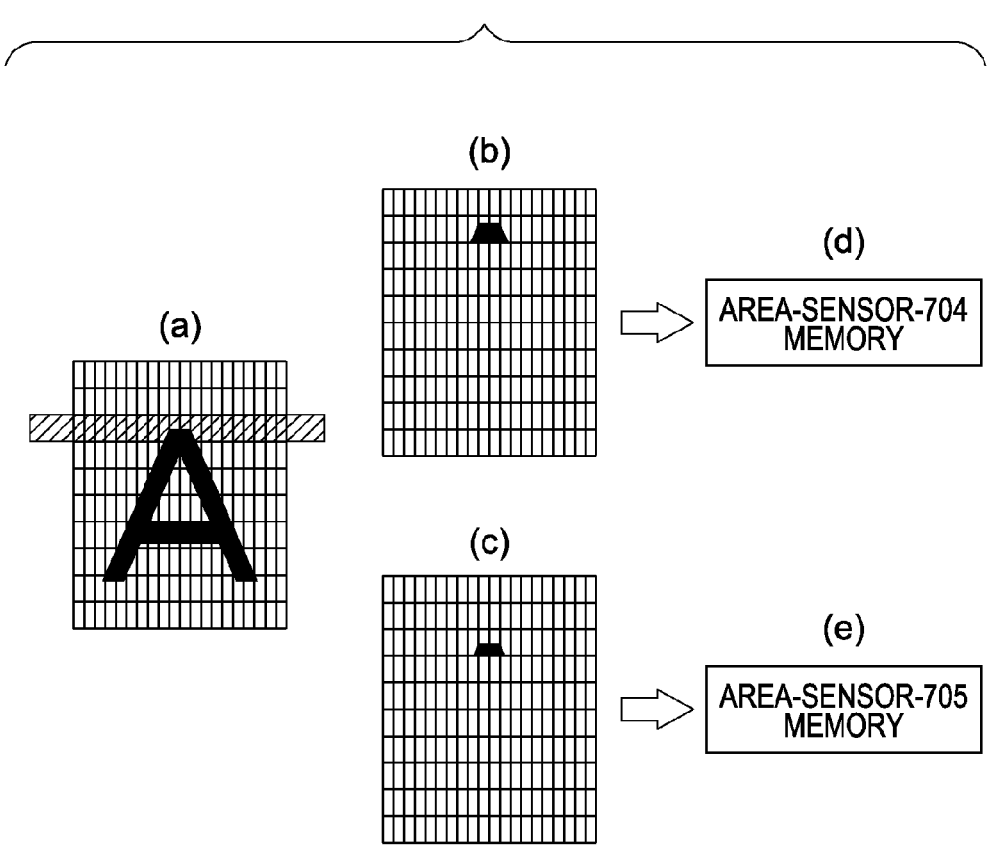
FIG. 9 shows a method of acquiring line image data.

First, the diagonally shaded area shown in part (a) of FIG. 9 is irradiated with light emitted from the light source at a certain moment. Then, the area sensor detects the light and the original image corresponding to the line-width part irradiated with the light.

At that time, for example, the line sensor 704 detects an exemplary image-data item shown in part (b) of FIG. 9. At the same time, the line sensor 705 detects an exemplary image-data item shown in part (c) of FIG. 9.

The read positions of the two image-data items are shifted from each other because the two line sensors are installed with a physical distance therebetween in the sub-scanning direction.

Then, original images for reading are handled as image-data items varying from one read-line sensor to another and the image-data items are separately stored in storage mediums such as memories shown in parts (d) and (e) of FIG. 9.

Figure 10:
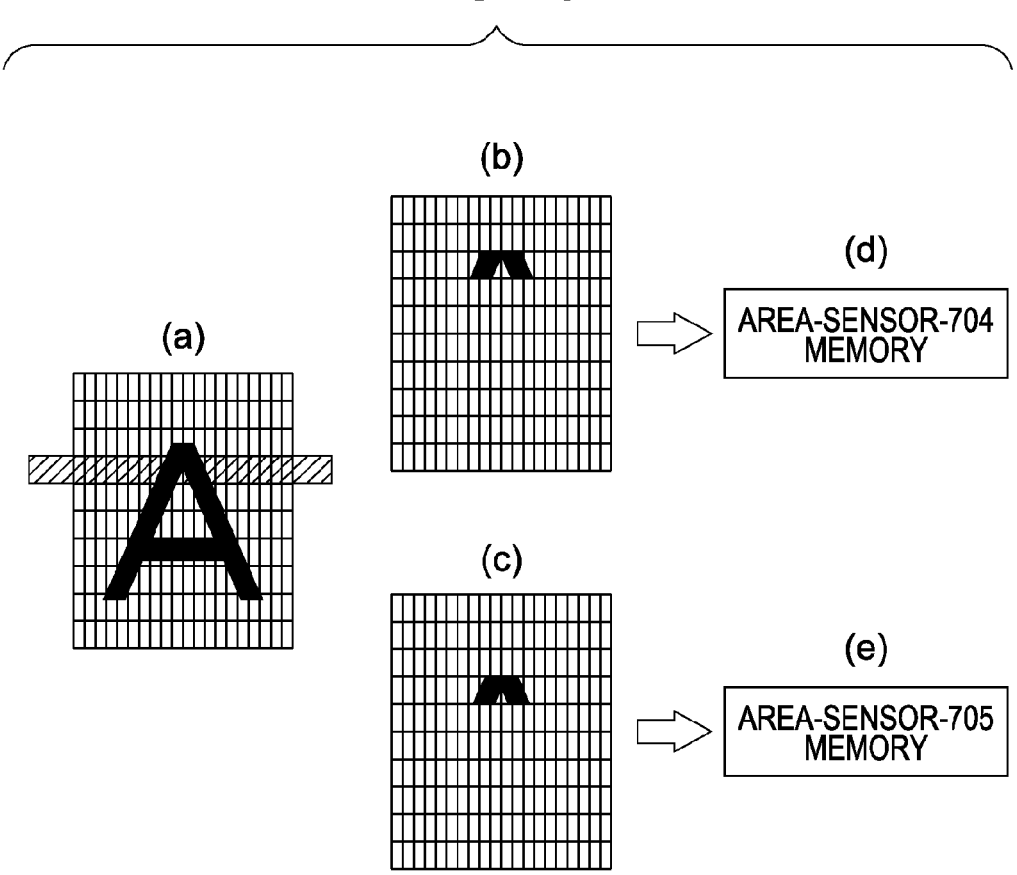
FIG. 10 shows another method of acquiring line image data.

Next, at the same time as when the sensor unit 205 and the light source are moved, the position of the original image detected by the line sensor is changed, as shown in part (a) of FIG. 10. Then, the line sensor 704 detects an image shown in part (b) of FIG. 10 and the line sensor 705 detects an image shown in part (c) of FIG. 10.

Then, original images for reading are handled as image-data items varying from one read-line sensor to another and the image-data items are separately stored in storage mediums such as memories shown in parts (d) and (e) of FIG. 10.

Figure 11:
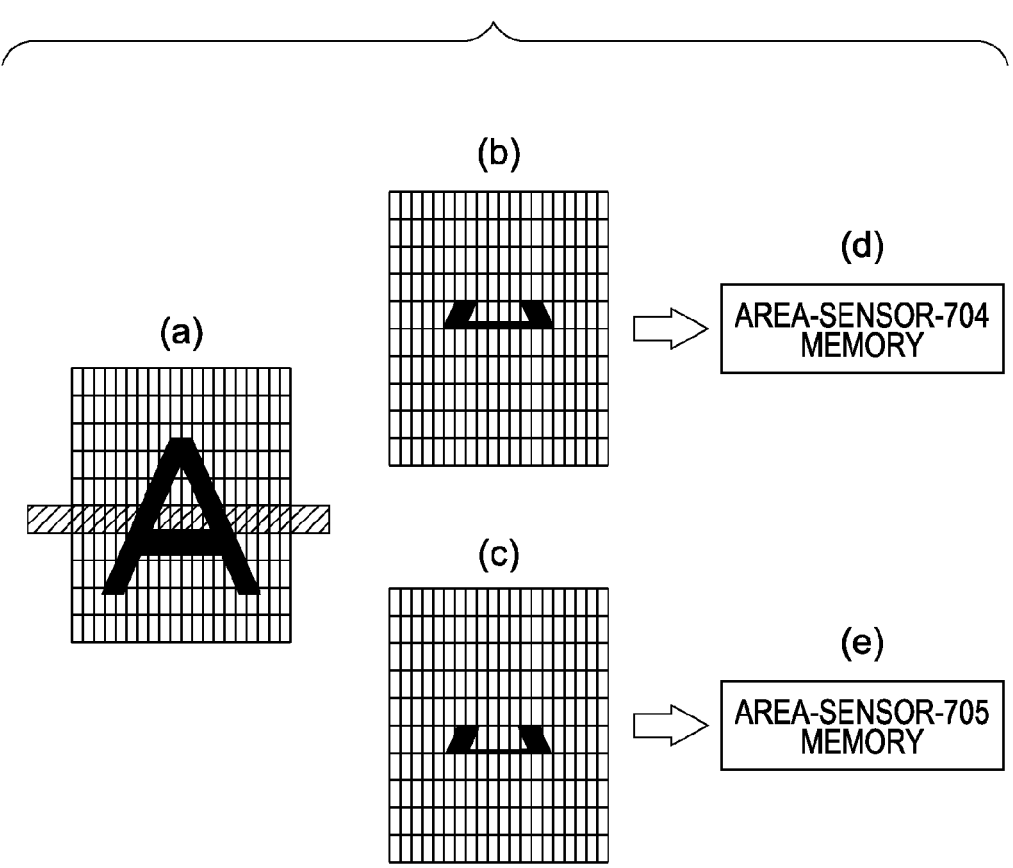
FIG. 11 shows another method of acquiring line image data.
Figure 12:
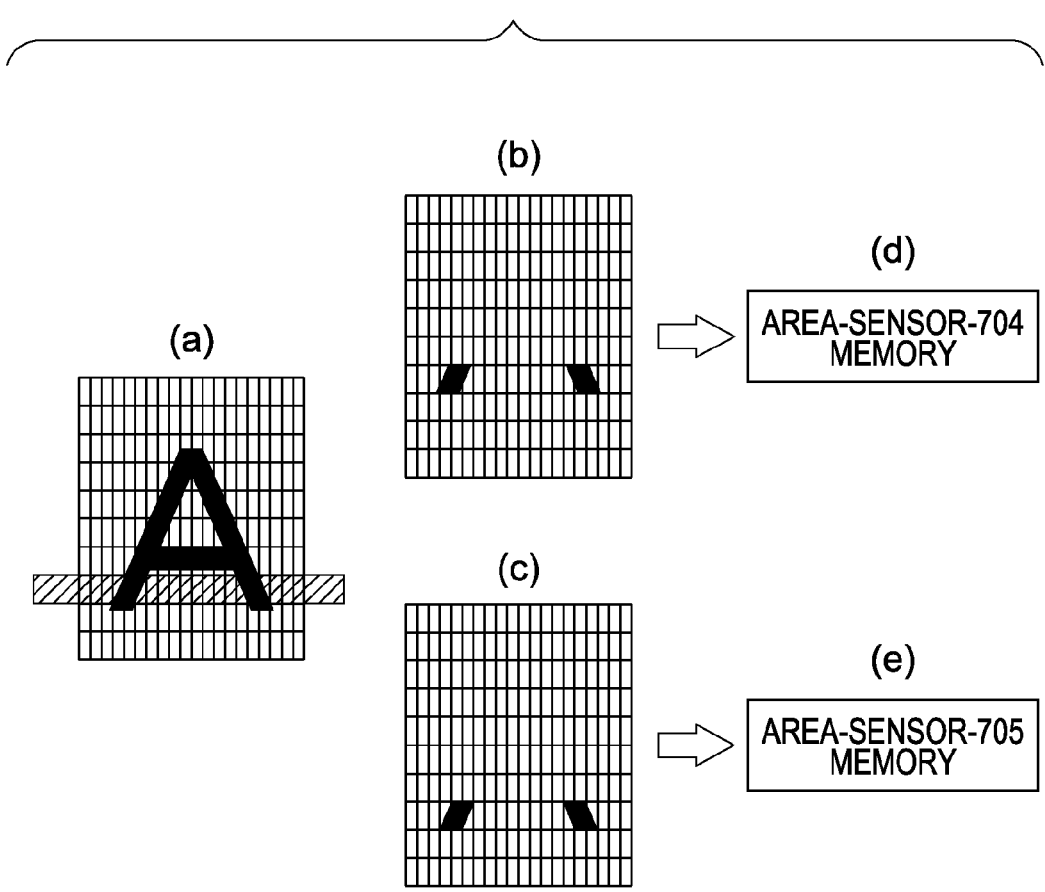
FIG. 12 shows another method of acquiring line image data.

Similarly, when a part of the original image is read, the part corresponding to a position shown in part (a) of FIG. 11, image-data items shown in parts (b) and (c) of FIG. 11 are stored in storage mediums such as memories shown in parts (d) and (e) of FIG. 11.

Further, when a part of the original image is read, the part corresponding to a position shown in part (a) of FIG. 12, image-data items shown in parts (b) and (c) of FIG. 12 are stored in storage mediums such as memories shown in parts (d) and (e) of FIG. 12.

Figure 13:
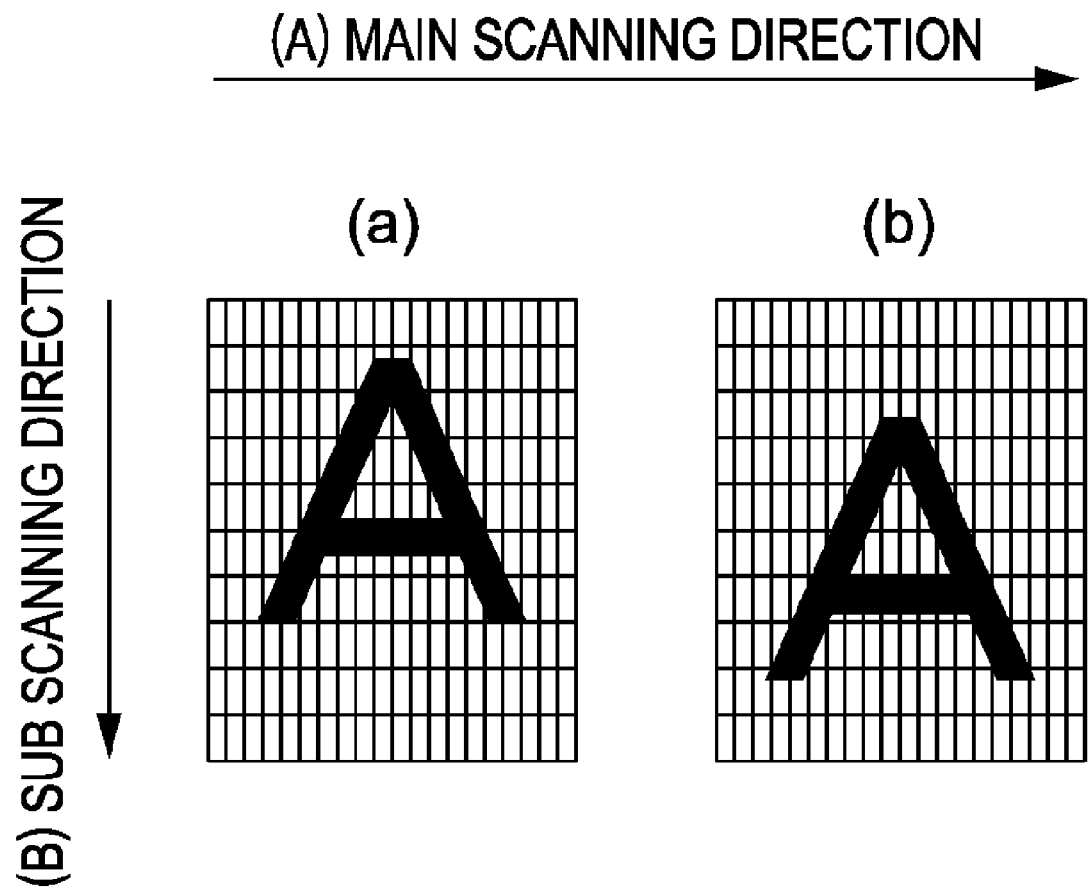
FIG. 13 shows image data read by a line sensor provided in the area sensor.

Finally, the entire original image is irradiated with light emitted from the light source, and each of line sensors reads data items of the original image at its position. Then, the read image-data items are orderly stored in the memories so that a plurality of image-data items can be acquired, where the image-data items are shifted from each other by as much as a single pixel in the sub-scanning direction shown in parts (a) and (b) of FIG. 13.

The image-data items with the shift in the sub-scanning direction become image data of the same number of frames as that of the line sensors, where each of the line sensors includes a group of area sensors. When the pixel sensors are two-dimensionally arranged and used as the area sensor for reading image data in the above-described manner, consecutive frame-image-data items with phases shifted in the sub-scanning direction, the consecutive frame-image-data items corresponding to a plurality of frames, can be acquired through a single read operation.

Next, a method of using the area sensor in the apparatus used in the above-described embodiment will be described. First, the area sensor shown in FIG. 7 is mounted on the reader in a slanting position.

Figure 14A:
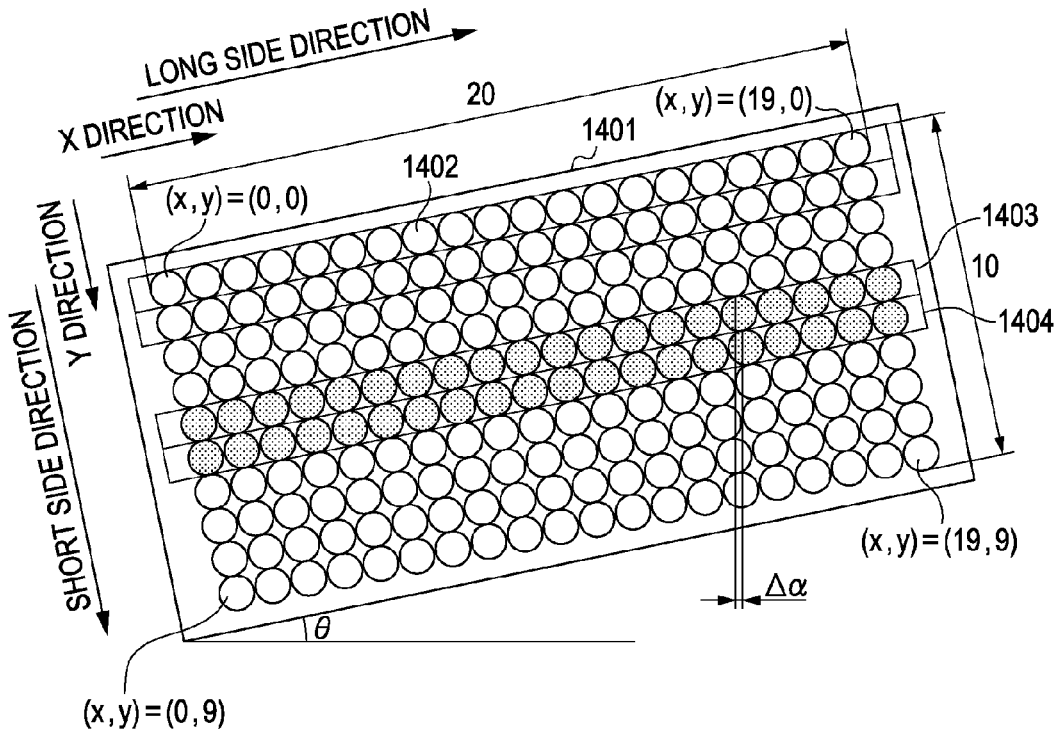
FIG. 14A is a configurational diagram showing the area sensor mounted in a slanting direction.
Figure 14B:
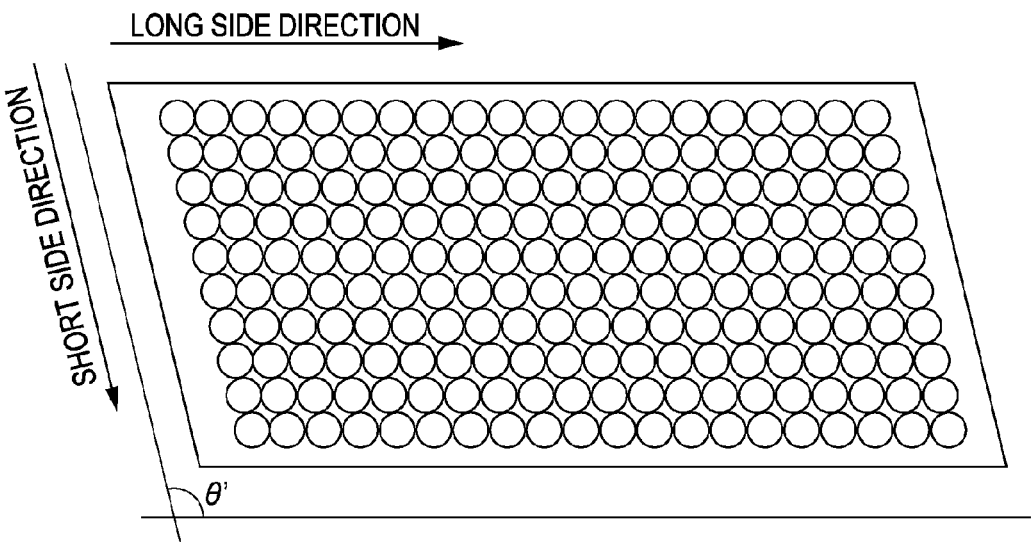
FIG. 14B is a configurational diagram showing the area sensor mounted in another slanting direction.

Each of FIGS. 14A and 14B shows exemplary mounting of the area sensor used in the above-described embodiment. FIG. 14A shows an area sensor device 1401 and pixel sensors 1402. In the following description, the pixel sensor 1402 includes the pixel sensors of 20 pixels arranged in the long-side direction and those of 10 pixels arranged in the short-side direction.

Then, the area sensor is mounted, so as to be slanted in relation to the reference installation position. The position of each of the pixel sensors included in the area sensor is expressed by determining the upper left end of the area sensor to be the origin point, the long-side direction to be the x direction, and the short-side direction to be the y direction. Namely, the coordinates of the upper left end are expressed by the equation (x, y)=(0, 0), and those of the upper right end are expressed by the equation (x, y)=(19, 0).

Similarly, the coordinates of the lower left end are expressed by the equation (x, y)=(0, 9) and those of the lower right end are expressed by the equation (x, y)=(19, 9).

A black frame 1403 indicates the group of the pixel sensors corresponding to a single line, the pixel sensors constituting the area sensor device 1401. More specifically, the black frame 1403 indicates 20 pixel sensors arranged in the long-side direction.

That is to say, the black frame 1403 indicates pixel sensors, where the positions of the pixel sensors correspond to coordinates (0, 4), (1, 4), (2, 4), . . . (19, 4).

In the following description, the pixel sensors surrounded by the black frame 1403 are referred to as a read-line sensor 1403. Similarly, a black frame 1404 shows pixel sensors, where the positions of the pixel sensors correspond to coordinates (0, 5), (1, 5), (2, 5), . . . (19, 5). In the following description, the pixel sensors surrounded by the black frame 1404 are referred to as a read-line sensor 1404.

In the above-described embodiment, the read unit 205 including the area sensor 213 mounted on the reader is driven in the direction of an arrow shown in FIG. 2 so that an original image placed on the original plate 204 is read.

Namely, the read line sensors 1403 and 1404, where each of the sensors 1403 and 1404 is a group of the pixel sensors, are handled as the line sensor. Consequently, the read operation is performed.

Next, how image data read by the read line sensors 1403 and 1404 are handled will be described. FIG. 8 shows the original image which is read, as in the following description. That is to say, the above-described original image corresponds to the original image 203 shown in FIG. 2.

What is indicated by the grid shown in FIG. 8 corresponds to the resolution of the pixel sensors included in the read line sensors 1403 and 1404. The original image is read as described above with reference to FIGS. 9 to 13. However, since the original image is inclined at a θ° angle, image data inclined θ° is acquired.

Figure 15:
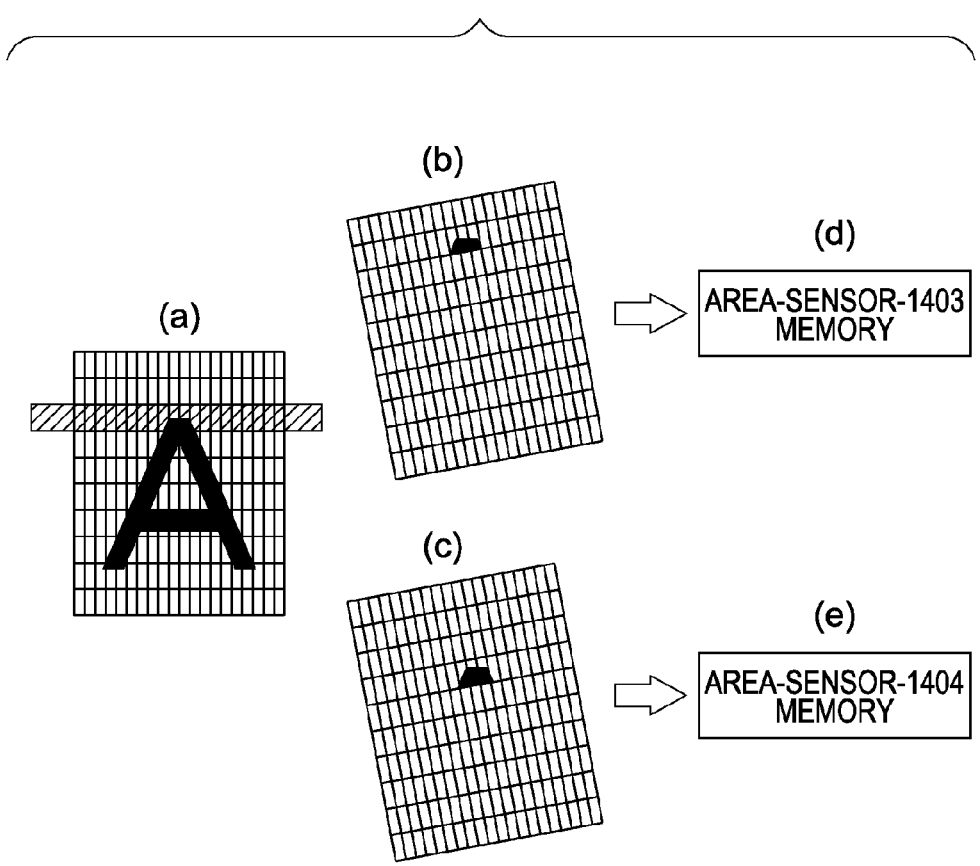
FIG. 15 shows a method of acquiring line image data through the inclined area sensor.

If the area sensor is not inclined, an image shown at a position indicated by a diagonally-shaded part shown in part (a) of FIG. 15 is read, for example. However, since the area sensor is inclined, the line sensors 1403 and 1404 detect image-data items shown in parts (b) and (c) of FIG. 15.

Figure 16:
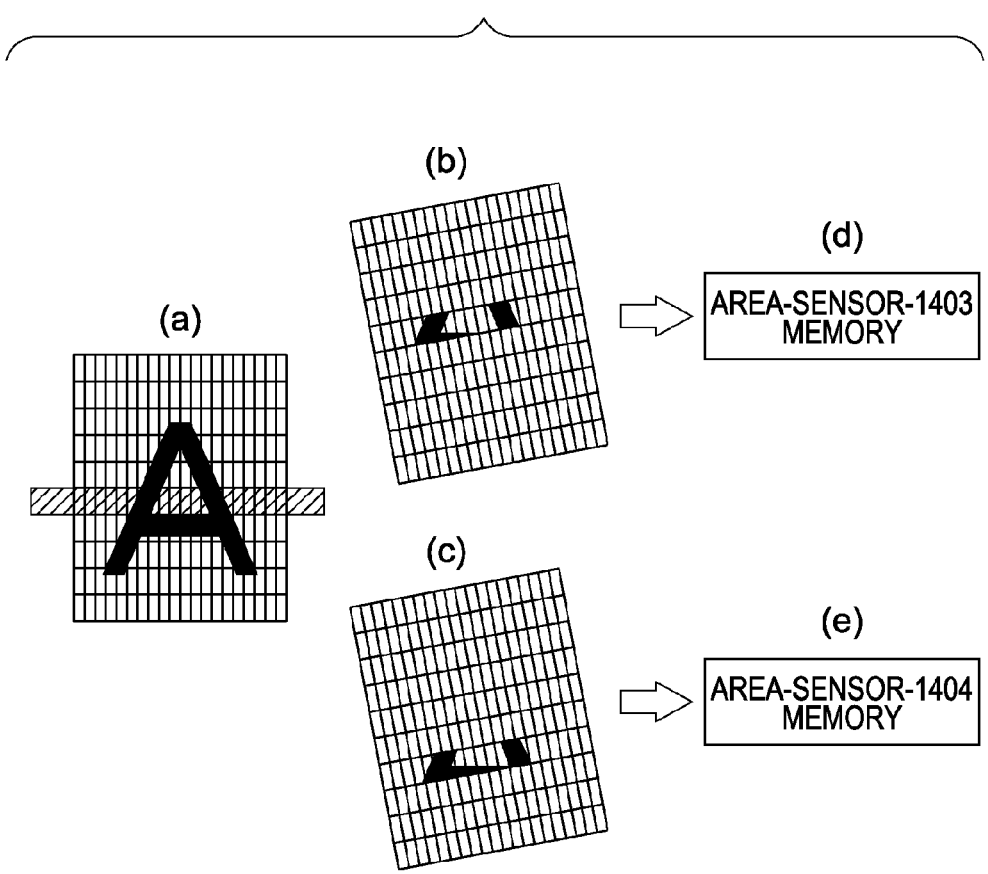
FIG. 16 shows another method of acquiring line image data through the inclined area sensor.

Then, the above-described image-data items are stored, where the inclinations thereof are left unchanged, in storage mediums such as memories shown in parts (d) and (e) of FIG. 15. Similarly, at the same time as when the sensor unit 205 and the light source are moved, an image shown at a position indicated by a diagonally-shaded part shown in part (a) of FIG. 16 is read. At that time, the line sensors 1403 and 1404 detect image-data items shown in parts (b) and (c) of FIG. 16.

Then, the above-described image-data items are stored in storage mediums such as memories shown in parts (d) and (e) of FIG. 16.

Figure 17:
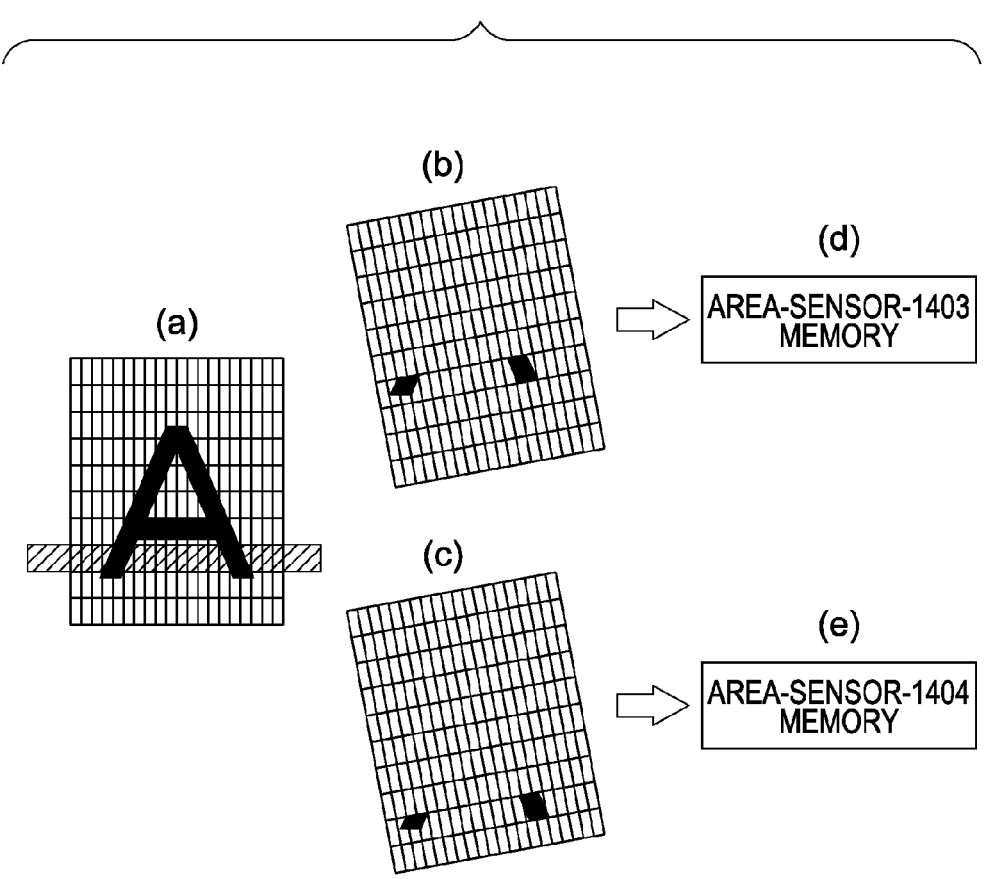
FIG. 17 shows another method of acquiring line image data through the inclined area sensor.

Further, the light source is moved as the read unit is moved in the sub-scanning direction so that an image shown at a position indicated by a diagonally shaded part shown in part (a) of FIG. 17 is read. At that time, the line sensors 1403 and 1404 obtain image-data items shown in parts (b) and (c) of FIG. 17.

Then, the above-described image-data items are stored in storage mediums such as memories shown in parts (d) and (e) of FIG. 17.

Figure 18:
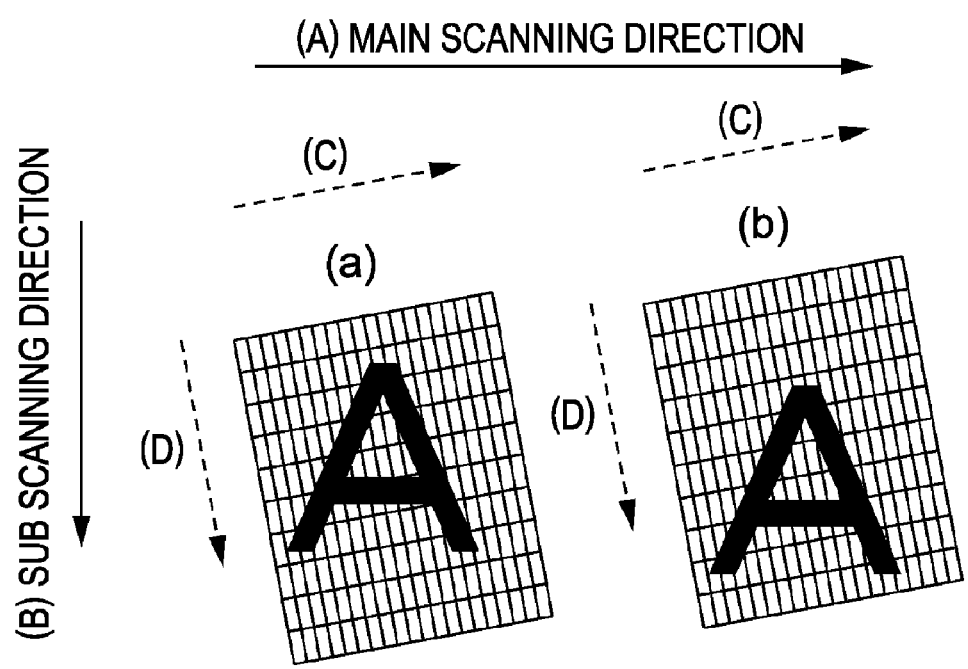
FIG. 18 shows image data read by a line sensor provided in the inclined area sensor.

Ultimately, the image-data items detected and read by the line sensors 1403 and 1404 are data items shown in parts (a) and (b) of FIG. 18. Each of the data items is read as image data inclined at a θ° angle. At that time, the direction indicated by an arrow (A) and that indicated by an arrow (B) that are shown in FIG. 18 are respectively referred to as the main-scanning direction and the sub-scanning direction. On the other hand, the direction indicated by an arrow (C) is referred to as the landscape orientation of read-image data. Further, the direction indicated by an arrow (D) is referred to as the portrait orientation of read-image data.

As shown in FIG. 14A, the read-line sensor 1403 and the read-line sensor 1404 are physically shifted from each other in the short-side direction by as much as a single pixel sensor. Therefore, the phases of the pixel sensors included in the read-line sensor 1403 are shifted from those of the pixel sensors included in the read-line sensor 1404 in the long-side direction.

For example, a pixel sensor located at the position corresponding to coordinates (x, y)=(15, 4), the pixel sensor being included in the read-line sensor 1403, is shifted from a pixel sensor located at the position corresponding to coordinates (x, y)=(15, 5), the pixel sensor being included in the read-line sensor 1404, in the y-axis direction which is the short-side direction by as much as y=1. The above-described shift causes the pixel sensors of the read-line sensors 1403 and 1404 to be shifted from each other by as much as Δβ in the sub-scanning direction.

On the other hand, the position of the pixel sensor of the read-line sensor 1403 in the x-axis direction which is the long-side direction is x=15, which is the same as that of the pixel sensor of the read-line sensor 1404. However, due to the inclination angle θ, the phases of the above-described pixel sensors are shifted from each other in the horizontal direction defined at the reference installation position by as much as Δα which is a small amount that falls within a sub pixel. Namely, even though the position of the pixel sensor of the read-line sensor 1403 is provided at the same position as that of the pixel sensor of the read-line sensor 1404 in the x-axis direction determined to be the long-side direction, a phase shift measured in small units occurs when the area sensor is inclined. The above-described phase shift depends on the inclination angle.

Therefore, the phase shifts of individual image-data items read by read-line sensors defined in the area sensor 213 vary from one line sensor to another.

More specifically, the phase of the image data shown in part (a) of FIG. 18 is shifted from that of the image data shown in part (b) of FIG. 18 not only in the sub-scanning direction by as much as Δβ, but also in the main-scanning direction by as much as Δα.

Although the number of the read line sensors (the read-line sensors 1403 and 1404) is two in the above-described embodiment, a different number of the read line sensors may be used without being limited to the above-described embodiment.

The number of the pixel sensors included in the area sensor 213 may be increased in the x-axis direction so that a large number of the read-line sensors are provided. Namely, it becomes possible to provide as many read-line sensors as the pixels that are included in the area sensor 213 and that are arranged in the x-axis direction.

The number of the read-line sensors is equivalent to that of image-data items obtained through a single read operation. Namely, if the read-line sensors corresponding to 30 lines are provided in the area sensor 213, it becomes possible to acquire 30 read images through a single read operation, where each of the read images has a unique phase shift.

Thus, the area sensor is inclined so that a plurality of frame-image-data items is read at a time. According to the frame-image-data items, the positions of the original images read by the pixel sensors adjacent to one another in the scanning-long-side direction are shifted from one another by as much as less than a single pixel.

Further, the area sensor 213 may be installed as shown in FIG. 14B. The long-side direction is the same as the horizontal direction determined at the reference installation position. However, the area sensor 214 is inclined in the short-side direction in relation to the reference-installation position.

In that case, it becomes also possible to obtain frame-image-data items through the original image scanning at a time, where the positions of the original images read by the pixel sensors adjacent to one another in the short-side direction are shifted from one another in the main-scanning direction and/or the sub-scanning direction by as much as less than a single pixel, as is the case with FIG. 14A.

That is to say, any area sensor including a plurality of sensors may be used, so long as the scanning position is moved in relatively parallel with the original image so that frame-image data is obtained, where the positions of original images read by sensors adjacent to one another in the short-side direction are shifted from one another in the main-scanning direction and/or the sub-scanning direction by as much as less than a single pixel.

Further, each of the inclination angle θ shown in FIG. 14A and the inclination angle θ' shown in FIG. 14B may be any angle so long as frame-image-data items can be obtained through a single original image scanning, where the positions of original images read by sensors adjacent to one another in the short-side direction are shifted from one another in the main-scanning direction and/or the sub-scanning direction by as much as less than a single pixel.

Further, it becomes possible to increase the number of frame-image-data items acquired by the sensors in the short-side direction by increasing the number of times the original image is read in the sub-scanning direction and the number of times sampling is performed per unit time.

Detailed Description of Printer-Image-Processing Unit 315

Figure 6:
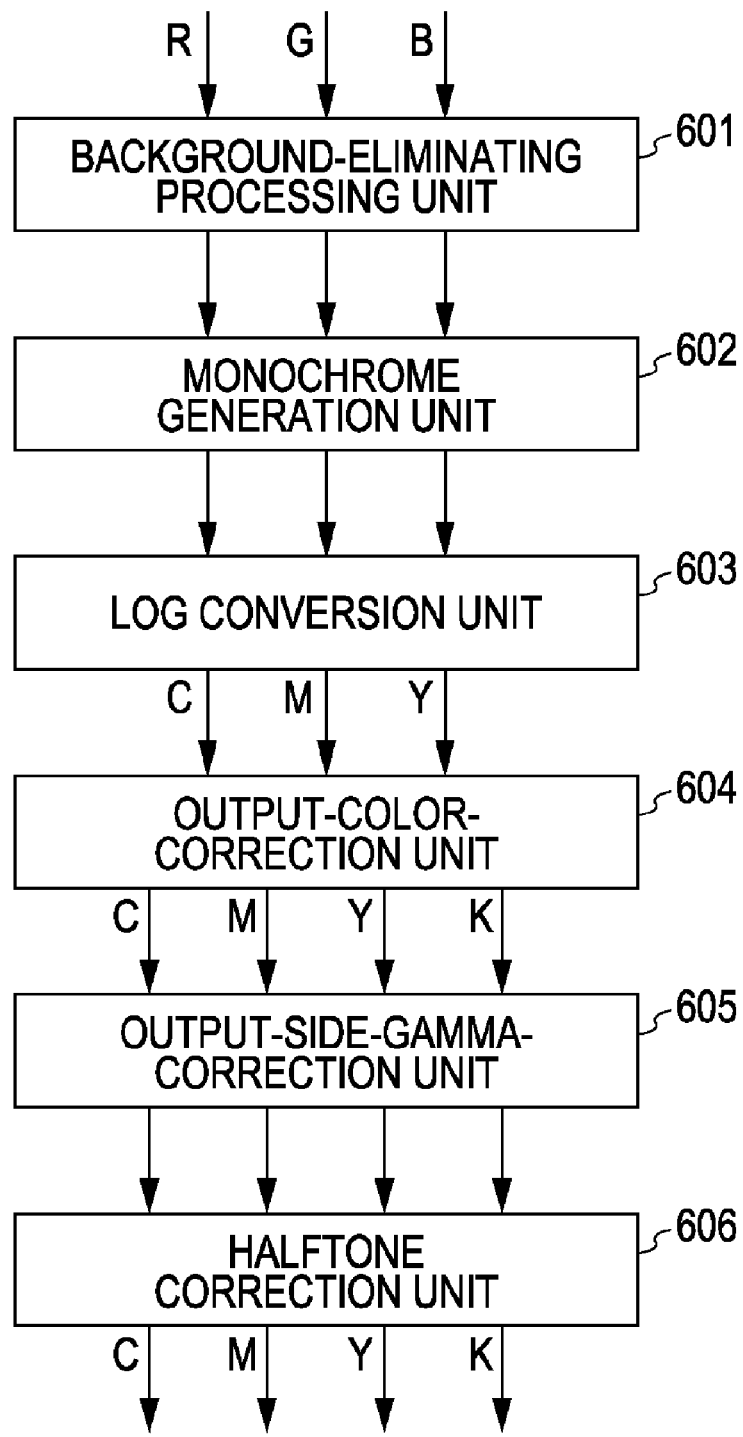
FIG. 6 is a block diagram showing the internal configuration of a printer image processing unit.

FIG. 6 shows the internal configuration of a printer-image-processing unit 315. A background-eliminating-processing unit 601 eliminates (removes) the background color of image data based on histogram data generated through the scanner-image-processing unit 312.

A monochrome-generation unit 602 converts color data into monochrome data. A log-conversion unit 603 performs luminance-to-density conversion. The above-described log-conversion unit 603 converts RGB input image data to CMY image data, for example.

An output-color-correction unit 604 performs output-color correction. For example, CMY input image data is converted into CMYK image data by using a table and/or a matrix.

An output-side gamma correction unit 605 performs correction so that a signal-value data transmitted thereto becomes proportional to reflection-density-value data obtained after copying and data outputting are performed.

A halftone correction unit 606 performs halftone processing in accordance with the gradation number of the printer unit 12 which outputs data. For example, the halftone correction unit 606 converts high-gradation image data transmitted thereto into 2-level image data and/or 32-level image data.

Further, each of the processing units provided in the scanner-image-processing unit 312 and/or the printer-image-processing unit 315 can output image data transmitted thereto without performing processing for the image data. Letting data pass through a certain processing unit without performing processing for the data in the above-described manner will be expressed as "letting data pass through a processing unit".

Super-Resolution-Processing Setting

Hereinafter, super-resolution-processing setting made in the above-described embodiment will be described in detail. Here, the area sensor shown in FIG. 14A is used in the above-described embodiment. Further, the following image-processing apparatus is used. Namely, when an original image is read through the area sensor, the image-processing apparatus can acquire frame-image data with a low resolution of about 100 dpi by as much as 50 frames through a single scanning operation. Further, the above-described image-processing apparatus can generate an image with a high resolution of 200 dpi through the high-resolution processing by using the low-resolution frame image data corresponding to 4 frames.

Similarly, the image-processing apparatus can generate an image with a high resolution of 300 dpi by using low-resolution frame image data by as much as 10 frames. Further, the image-processing apparatus can generate an image with a high resolution of 600 dpi by using low-resolution frame image data by as much as 40 frames. Still further, the image-processing apparatus can generate an image with a high resolution of 1200 dpi by using low-resolution frame image data by as much as 100 frames. Still further, the image-processing apparatus can generate an image with a high resolution of 2400 dpi by using low-resolution frame image data by as much as 400 frames.

Here, the number of frames of low-resolution frame image data necessary to acquire a desired resolution is not limited to the above-described frame numbers. For example, the image-processing apparatus may generate an image with a high resolution of 1000 dpi by using low-resolution frame image data by as much as 50 frames. Further, the image-processing apparatus may generate an image with a high resolution of 500 dpi by using low-resolution frame image data by as much as 50 frames. The above-described frame number depends on the capacity of the image-processing apparatus.

Further, not all of the acquired low-resolution frame image data can be used. For example, when the positions of pixels reading the frame image data acquired by adjacent sensors are shifted from one another by as much as a single pixel or more, namely, when the value of the phase shift is a single pixel or more, it becomes difficult to use the frame image data for the super resolution processing. The above-described low-resolution frame image data is not counted as the acquired frame number.

Figure 19:
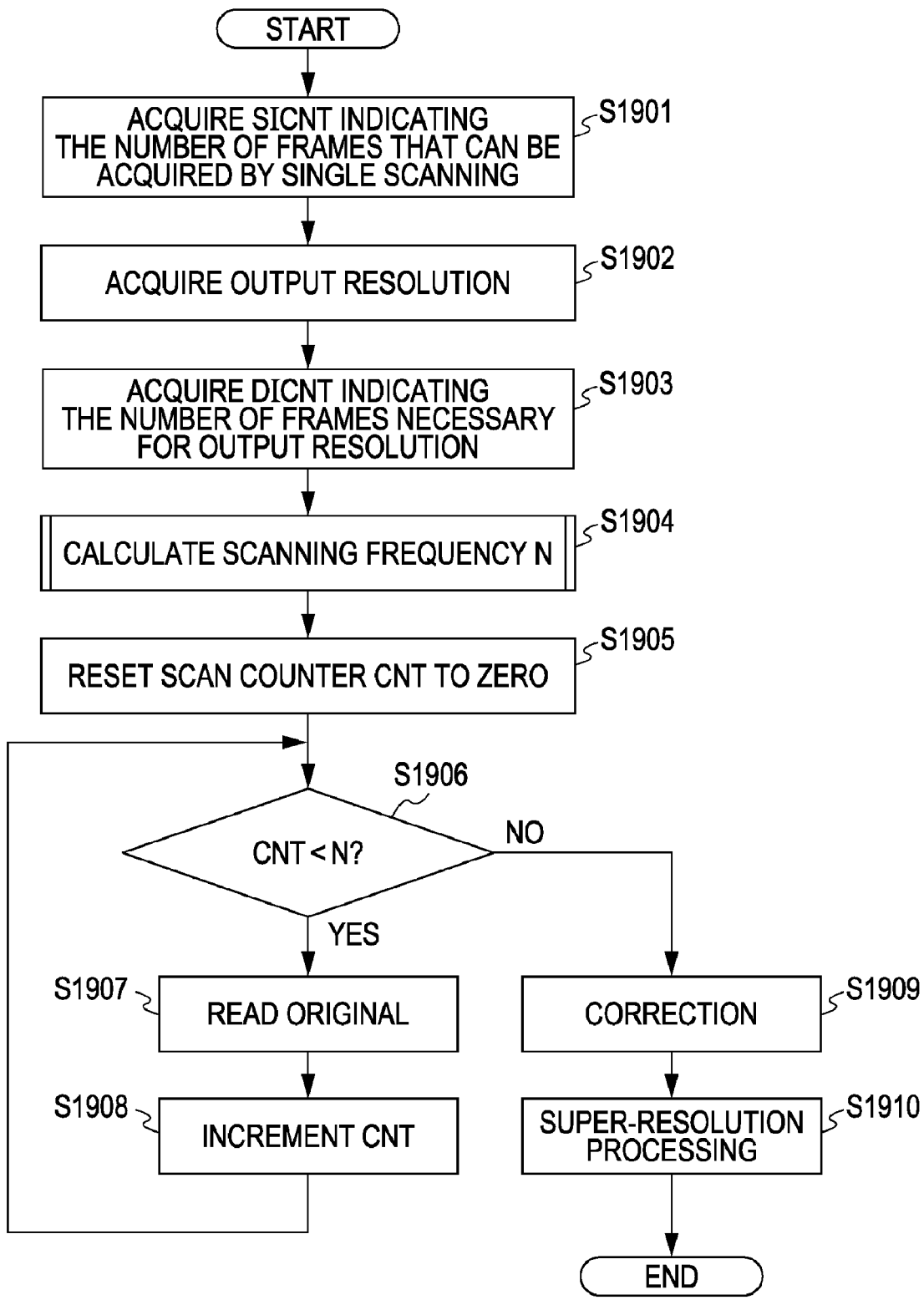
FIG. 19 is a flowchart provided to schematically describe operations performed to execute super-resolution processing mode setting processing related to a first embodiment of the present invention.

FIG. 19 illustrates operations performed to execute super-resolution-processing-mode-setting processing. A control program implementing processing procedures shown in FIG. 19 is stored in the ROM 303 and executed by the CPU 301, as described above.

First, at step S1901, an instruction to acquire SICNT, which is the maximum number of the number of low-resolution frame-image-data items that can be acquired through a single scanning operation, is transmitted from a user via a user interface (UI).

Then, upon receiving the instruction, the UI transmits the above-described instruction to the CPU 301 via the operation-unit I/F 305, and the CPU 301 acquires the SICNT data and stores data of the number of frames used for the maximum frame-image data. The above-described maximum frame number is determined based on the number of columns arranged in the short side direction of a sensor that will be described later.

Further, the number of frame-image-data items acquired in the direction of the short side of the sensor can be increased by increasing the frequency of reading the original image in the sub-scanning direction and the frequency of sampling data per unit time. Since frame image data with a low resolution of about 100 dip can be acquired by as much as 50 frames in the above-described embodiment, the value of the SICNT data is determined to be 50.

Next, at step S1902, data of an output resolution determined based on the SICNT data acquired at step S1901 is acquired.

Figures 20, 21:
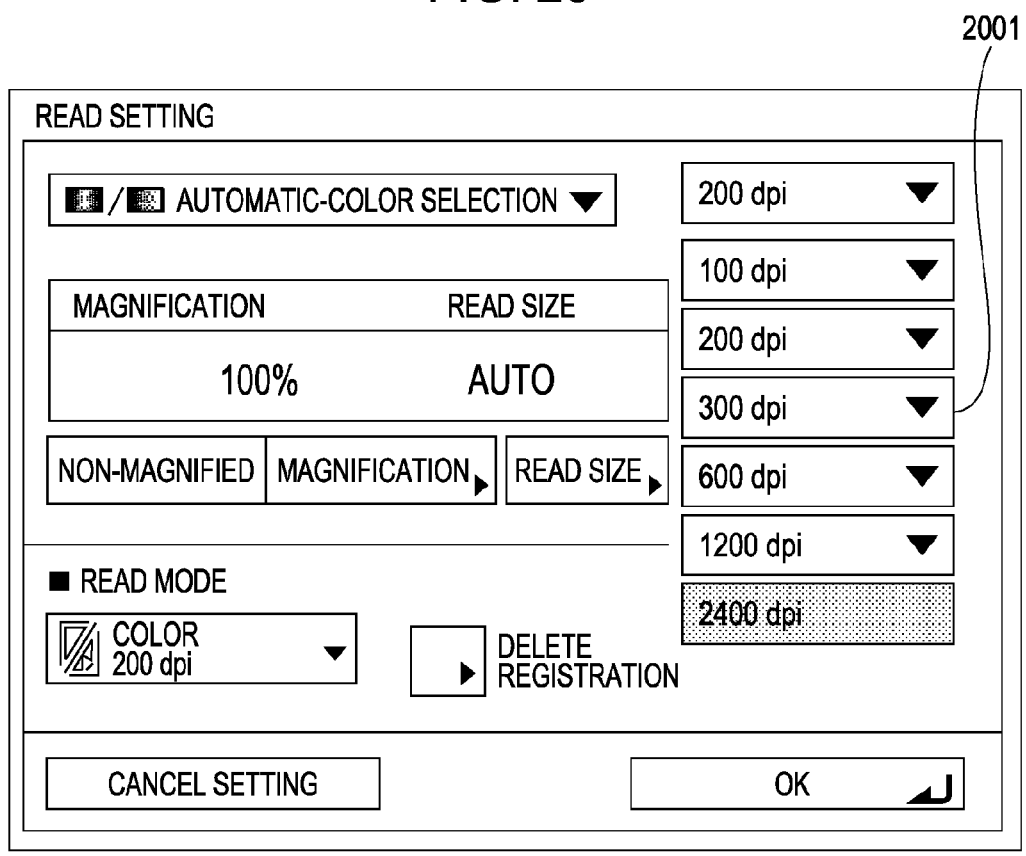
FIG. 20 shows a graphical user interface (GUI) showing an exemplary operation unit provided to determine an output resolution shown in FIG. 19 according to the first embodiment.
FIG. 21 shows a table providing information about the correspondence between the output resolution shown in FIG. 19 and the number of low-resolution images according to the first embodiment.

FIG. 20 is a schematic diagram showing an exemplary operation unit provided to determine the output resolution. The output resolution can be determined by the user on an output-resolution determining menu 2001.

Next, at step S1903, data of DICNT, which indicates the number of frames used in low-resolution frame image data necessary for the output resolution of which data is acquired at step S1902, is calculated. Namely, data of the number of frames of a necessary frame image is acquired.

In the above-described embodiment, data of a table providing information about the correspondences between output resolutions and the number of frames used in low-resolution frame-image-data items is stored in the ROM 303.

FIG. 21 shows a table provided to show information about the correspondence between output resolutions and the number of frames used for low-resolution frame-image-data items.

Next, at step S1904, the scanning operation frequency N is calculated according to the following expression:

$N = DICNT/SICNT.$

For example, when the output resolution is 2400 dpi, the expression DICNT=400 holds. Therefore, the scanning operation frequency N is calculated, as shown in the following expression:

$N = 400/50 = 8.$

Next, at step S1905, the value of a scan counter CNT is reset to 0, and the value of the scan counter CNT and the scanning operation frequency N are compared to each other at step S1906.

If it is determined that the value of the scan counter CNT is less than that of the scanning operation frequency N (YES at step S1906), data of an original is read at step S1907, the value of the scan counter CNT is incremented by 1 at step S1908, and processing then returns to step S1906. Thus, the read frequency is controlled based on a result of the read-frequency calculation.

On the other hand, if it is determined that the value of the scan counter CNT is not less than that of the scanning operation frequency N (NO at step S1906), it is determined that the original-data reading is finished. Then, the inclination of acquired frame image data is corrected at step S1909 and the super-resolution processing is executed at step S1910 so that the processing procedures are finished.

The inclination of the acquired frame image data is corrected, as described below. The inclination of the acquired frame image data is equivalent to the inclination angle θ of the area sensor, as described above.

The above-described inclination angle θ of the area sensor 213 is a value that can be acquired at the time when the area sensor 213 is mounted on the read unit 205 during the process of assembling an MFP including the area sensor 213.

Data of the above-described inclination angle θ is stored in a storage area provided in the MFP as data on a value unique to the mounted device.

The affine transform is performed by using the above-described angle information so that acquired inclined frame-image data is rotated. At that time, the frame image data is rotated by as much as an inclination from the reference installation position so that the inclination of the frame image data is corrected. If the coordinates of the frame image data that had not been subjected to the affine transform and those of the frame image data that had been subjected to the affine transform are determined to be (X, Y) and (X', Y'), respectively, and the rotation angle (the inclination angle of the area sensor in the above-described embodiment) is determined to be θ, frame image data of which inclination is corrected through affine-transform processing is obtained, as shown by Equation 1.

[Equation 1]

$$[X', Y'] = [X, Y] \begin{bmatrix} \cos\theta & \sin\theta \\ -\sin\theta & \cos\theta \end{bmatrix} \quad \text{(Equation 1)}$$

X', Y': coordinate position attained after transform
X, Y: coordinate position attained before transform The frame image data obtained through the affine transform becomes low-resolution frame image data with a corrected inclination.

Here, the method of correcting the inclination is not limited to the affine transform. Namely, any method can be used so long as the inclination of the frame image data can be corrected therethrough. If a sensor which can obtain the frame image data in which the positions at which the sensors adjacent to one another in the short-side direction read data are shifted from one another in the main scanning direction and/or the sub scanning direction by as much as less than a single pixel, as shown in FIG. 14B, can obtain frame image data with no inclination, the above-described processing is unnecessary.

Then, the super-resolution processing is executed at step S1910 by using frame image data with corrected inclination, the frame image data corresponding to a plurality of frames, so that the processing is finished. Here, the steps S1909 and S1910 are not in particular order. The super-resolution processing may be executed first so that the inclination of high-resolution image data acquired through the super-resolution processing is corrected after the super-resolution processing.

The super-resolution processing is executed to generate high-resolution image data by using a plurality of frame-image-data items with phases shifted from one another by as much as less than a single pixel in the main scanning direction and the sub scanning direction for each RGB channel, as shown in FIG. 5.

For example, frame-image-data items 501, 502, 503, and 504 that are shown in FIG. 5 are shifted from one another by as much as one-half of a pixel by using four image-data items. Therefore, it becomes possible to obtain a high-resolution image having a pixel density which is four times higher than that of original image data 505 by using the above-described image data.

Figure 22:
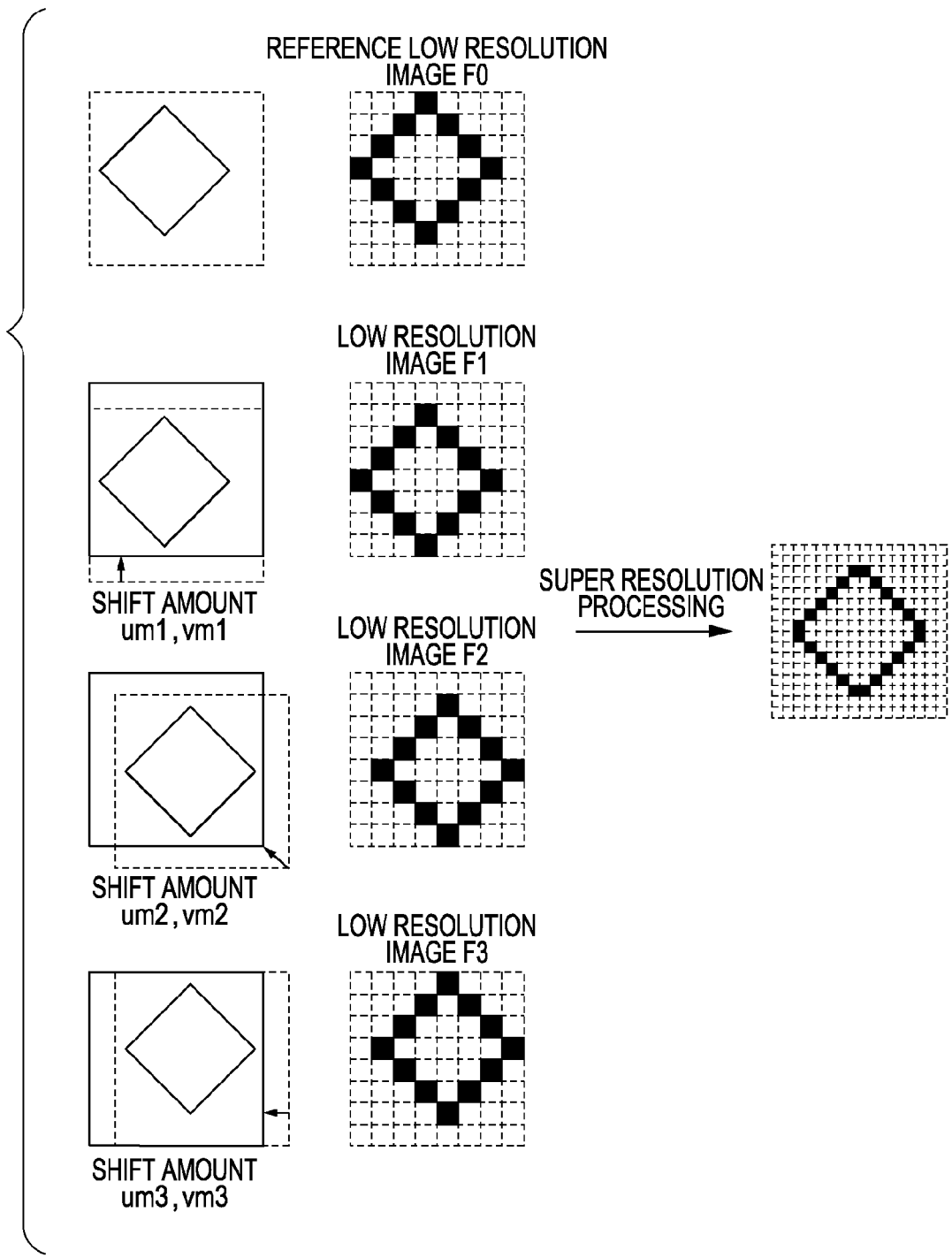
FIG. 22 provides a detailed explanation of super-resolution processing.

The high-resolution processing executed at that time will be more specifically described with reference to FIGS. 22 and 23. FIG. 22 shows low-resolution frame-image data used for the high-resolution processing and image data that had been subjected to the high-resolution processing. FIG. 22 shows an original, and reference low-resolution image data F0 and object low-resolution image-data items F1 to F3 that are acquired by reading the original through the area sensor. Each of dotted rectangles surrounding the original indicates an area in which the reference low-resolution image data F0 is read by the area sensor, and solid-line rectangles indicate areas in which the object low-resolution image-data items F1 to F3 are respectively read by the area sensor.

In the above-described embodiment, the amount of shift in the main-scanning direction is expressed as "um", and that of shift in the sub-scanning direction is expressed as "vm". Further, the shift amounts of object low-resolution image-data items Fn (n=1 to 3) are expressed as "umn", and "vmn". For example, as shown in FIG. 22, the object low-resolution image-data item F1 is shifted from the reference low-resolution image data F0 in the sub-scanning direction, and the shift amount is expressed as um1, vm1. Similarly, the shift amounts of the object low-resolution image-data items F2 and F3 are respectively expressed as um2, vm2, and um3, vm3.

The correction amounts un, vn of the object low-resolution image-data items Fn are calculated based on the image data of the reference low-resolution image data F0 and the image data of the object low-resolution image-data items F1 to F3. The above-described calculation is performed according to a predetermined calculation method using information about the inclination of the area sensor, where the information is stored in the ROM 303 in advance.

FIG. 22 schematically shows that the shift of each of the object low-resolution image-data items occurs in pixels. However, when data is read by the area sensor of the above-described embodiment, the phase shift occurs in the main scanning direction and the sub scanning direction by as much as less than a single pixel. It becomes possible to make a high-resolution image by using the above-described small shift.

Therefore, of the pixels included in a generated super-resolution-processing image, there are pixels that are not included in the reference low-resolution image data and the object low-resolution image data.

For the above-described pixels, a high-resolution image is generated while performing a merge by performing predetermined interpolation processing by using pixel data indicating the values of pixels provided around the generation pixel. As the interpolation processing, the bilinear interpolation method, the bicubic method, the nearest neighbor method, and so forth can be used.

Figure 23:
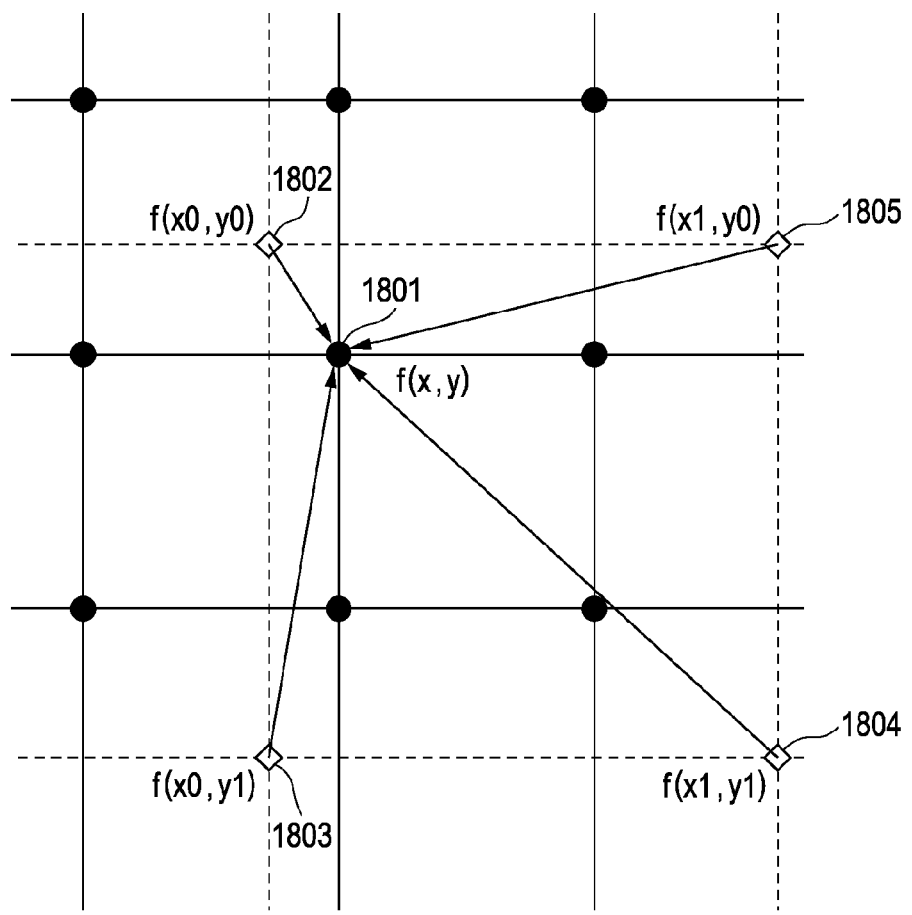
FIG. 23 provides another detailed explanation of the super-resolution processing.

For example, FIG. 23 shows the case where the interpolation processing is performed according to the bilinear interpolation method. First, data on the nearest pixel 1802 nearest the position of a generation pixel 1801 is extracted from the reference low-resolution image data and the object low-resolution image data. Then, four pixels surrounding the generation-pixel position are determined to be surrounding pixels 1802, 1803, 1804, and 1805. Further, values obtained by assigning predetermined weights to the data values of the surrounding pixels are averaged, and the data value of the generation pixel is obtained, as shown in the following equation.

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

The above-described processing procedures are performed for each of the generation-pixel positions so that a super resolution image with a resolution two times higher than that of an original image is obtained, as shown in FIG. 20. Here, the resolution may not be two times higher than that of the original image. Namely, various magnifications can be used. Further, as the values of low-resolution image-data items are used for the interpolation processing, the definition of a super-resolution image obtained through the interpolation processing is increased.

Original Read Processing

Original-read processing described at step S1905 shown in FIG. 19 will be specifically described. In the above-described embodiment, the original is read through the area sensor.

Figure 24:
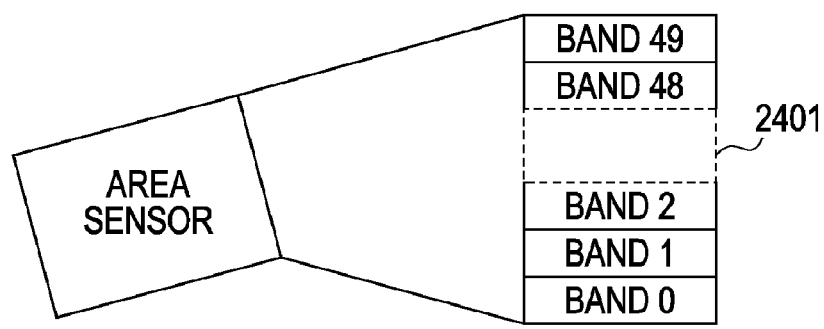
FIG. 24 shows a method of dividing an area sensor according to the first embodiment.

FIG. 24 shows an exemplary area sensor provided in the scanner unit 11 used in the above-described embodiment. In that case, the area sensor is divided into 50 parts in the sub-scanning direction, as indicated by a section 2401. Further, frame image data with a resolution of 100 dpi can be acquired in bands by as much as 50 frames at the maximum.

Control is performed so that data is read by determining one of the above-described bands to be a single line sensor. Further, in how many parts the above-described area should be divided, that is, how many line sensors are to be prepared are arbitrarily determined. In the above-described embodiment, the installed area sensor is divided into 50 parts and used, as 50 line sensors.

Therefore, if the value of the scanning operation frequency calculated at step S1904 shown in FIG. 19 is at least two, band-data items 0 to 49 that are acquired through the first scanning operation are respectively stored, as frame image-data items ID0 to ID49.

Then, band-data items 50 to 99 that are acquired through the second scanning operation are respectively stored, as frame image-data items ID50 to ID99. Thus, the frame image data is managed for each scanning operation based on the frame image data ID, which makes it possible to acquire low-resolution frame image data used to reproduce an ultimately specified output resolution.

Further, in the above-described embodiment, the scanning operation is continuously executed for a single page of the original image. At that time, the original image is fixed on the original plate and the light source is moved so that the original image is read. The above-described configuration is determined to be the first area-sensor system.

When the scanning operation is executed at least two times by using the above-described first area-sensor system, the original image placed on the original plate may not be deliberately moved. Although the position where the original image is placed is not changed, signals acquired through the first and second scanning operations are different from each other due to the optical characteristic of the light source and the precision of control performed by the device while the scanner executes scanning.

If the signal difference falls within a sub pixel, the data corresponding thereto may be adopted as low-resolution frame image data and used for the subsequent processing. Therefore, while the above-described scanning operations are performed, a warning message instructing the user not to move the original may be displayed on the UI. Otherwise, data on the number of remaining scanning operations may be displayed on the UI.

Aside from that, original images are often placed in an automatic document feeder (hereinafter referred to as an "ADF"), so as to scan a single set of documents including a plurality of pages.

At that time, the light source is fixed and the original images are moved so that the original images are read. The above-described configuration is determined to be the second area-sensor system.

In that case, after a single scanning operation is executed for the single set of documents, the user may be encouraged to place another set of documents in the ADF. In that case, data on the number of remaining scanning operations may be displayed on the UI.

In the case where the first read operation is executed on the original plate through the first area sensor system and the second read operation is executed by using the ADF through the second area sensor system in the above-described manner, the value of signals acquired at the read time through the first and second read operations are different from each other due to the precision of controlling the positions where the device reads data and the optical characteristic of the light source.

If the signal difference falls within a sub pixel, the data corresponding thereto may be adopted as low-resolution frame image data, and used for the subsequent processing.

Further, if the user stops performing the scanning operation in progress, high-resolution image data can be generated by using a plurality of low-resolution frame-image-data items obtained through at least one scanning operation performed by then.

The scanning operation number is determined in accordance with the set output resolution through the above-described processing procedures. Consequently, it becomes possible to output high-resolution image data that can be reproduced with difficulty through a single scanning operation.

Further, the above-described term "output" indicates converting a scanned image into a high-resolution image and actually printing the image data on a sheet. In addition, the above-described term "output" indicates storing the image data subjected to the high-resolution transform in the image-processing apparatus without printing the image data on a sheet.

According to the first embodiment, the scanning operation frequency is determined based on the set output resolution and the scanning operation is performed with the determined frequency so that high-resolution image data is output.

A second embodiment of the present invention illustrates the case where an image-processing apparatus on which the ADF is mounted performs the scanning operation a plurality of times. In that case, the first scanning operation is performed as scanning performed while a moving original fed from the ADF is read. Further, the same processing procedures as those performed in the first embodiment are designated by the same reference numerals and redundant schematic descriptions thereof are omitted.

Figure 25:
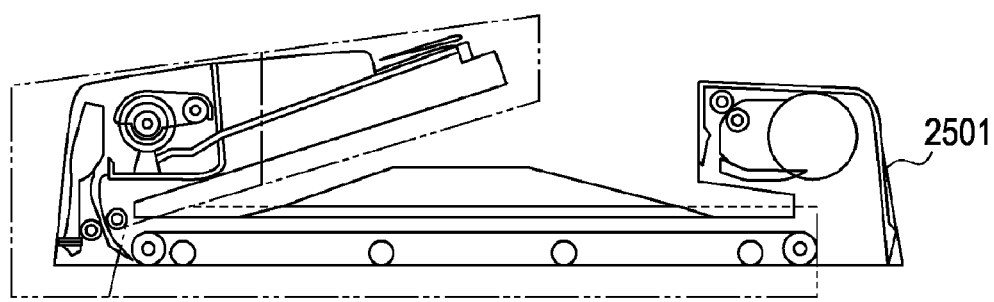
FIG. 25 is a diagram showing the configuration of an ADF provided in the scanner unit shown in FIG. 1 according to a second embodiment of the present invention.
Figure 26:
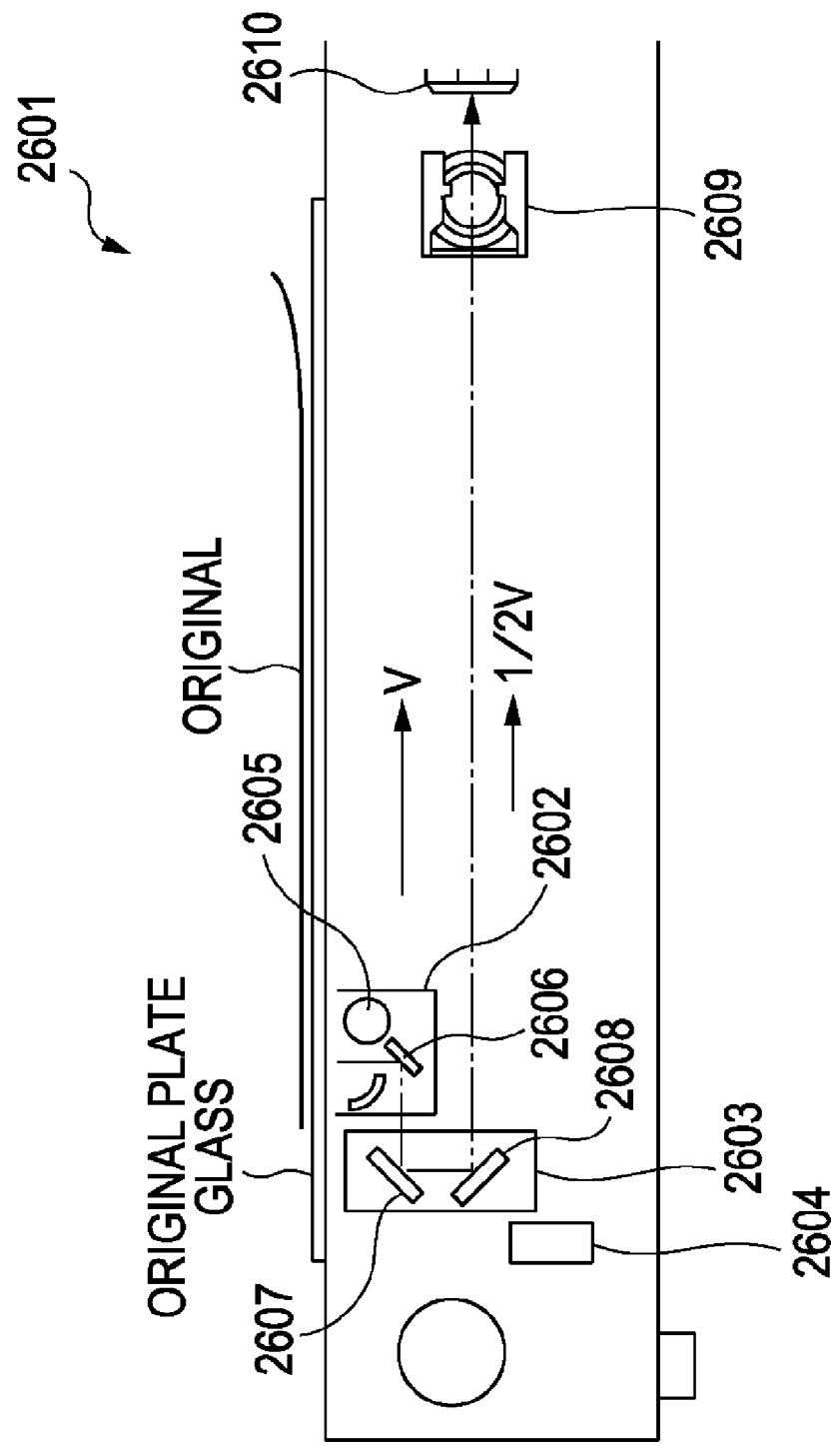
FIG. 26 is a diagram showing the configuration of a scanner main body provided in the scanner unit shown in FIG. 1 according to the second embodiment.

FIG. 25 shows an ADF 2501, which is a part of the scanner unit 11 described in FIG. 1, and FIG. 26 shows the configuration of a scanner main body 2601. The scanner unit 11 is provided with pressure-plate-reading mode in which an original image is placed still on the glass of the original plate and an optical system is moved so that the original image is read and moving-original-reading-mode in which the optical system is stopped and the original image is moved so that the original image is read.

Figure 27:
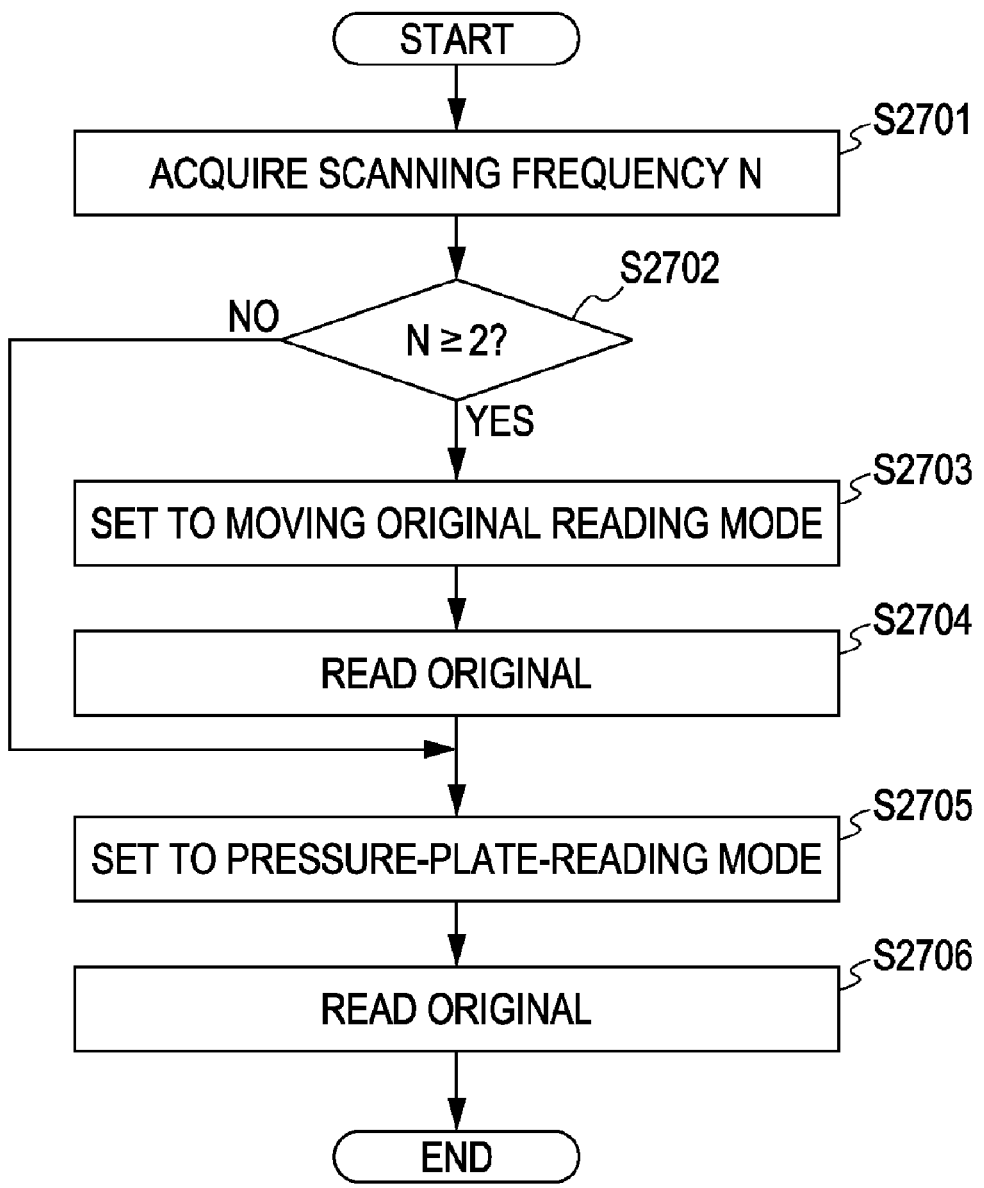
FIG. 27 is a flowchart schematically illustrating operations performed to execute original read processing shown in FIG. 19 according to the second embodiment.

FIG. 27 schematically illustrates an example of operations that can be performed to execute the moving-reading scanning and the pressure-plate-reading scanning during the original-image reading performed at step S1907 shown in FIG. 19 according to the second embodiment. A control program achieving processing procedures shown in FIG. 27 is stored in the ROM 303 and executed by the CPU 301, as described above.

First, at step S2701, the scanning operation frequency N calculated at step S1904 is acquired.

Next, it is determined whether the value of the scanning operation frequency N acquired at step S2701 is at least two at step S2702.

If it is determined that the value of the scanning operation frequency N is at least two (YES at step S2702), processing continues at step S2703, otherwise (NO at step S2702) processing continues at step S2705). At Step S2703, the first scanning operation is set to the moving-original-reading mode. Next, the ADF 2501 conveys an original image placed therein to the glass of the original plate of the scanner main body 2601 through a conveying roller.

In that case, an original image optically scanned in the moving-original-reading mode through the scanner main body 2601 is read as a plurality of low-resolution image-data items at step S2704.

After that, the original image is conveyed onto the glass of the original plate of the scanner main body 2601. Next, the remaining scanning operations are determined to be executed in the pressure-plate-reading mode at step S2705.

Then, the first mirror unit 2602 and the second mirror unit 2603 that are provided in the scanner main body are temporarily returned to the home position where a home position sensor 2604 is provided.

Then, an original illumination lamp 2605 is turned on and the original image is irradiated with the light thereof. The light reflected from the original image passes through a lens 2609 via the first mirror 2606 provided in the first mirror unit 2602 and the second and third mirrors 2607 and 2608 that are provided in the second mirror unit so that an image is formed on the area sensor 2610. After that, data on the image is transmitted to the area sensor 2610, as an optical signal, and the original-image reading is executed at step S2706 so that the processing procedures are terminated.

Thus, after the first original image reading is performed through the ADF, the original image is automatically conveyed to a position defined for the pressure-plate-reading mode even though the user does not place the original image at a different position, which saves the user time and trouble.

On the other hand, if it is determined that the value of the scanning operation frequency N is one at step S2702, the original reading is executed in the pressure-plate-reading mode while the processing procedures corresponding to steps S2703 and S2704 are not executed.

Thus, when the scanning operation is performed a plurality of times based on the set output resolution, the first scanning operation is performed as scanning performed while reading a moving original fed from the ADF.

After that, the pressure-plate-reading scanning is executed, which makes it possible to output high-resolution image data that can be reproduced with difficulty through a single scanning operation. Particularly, if the scanning operation is performed twice in the second embodiment, reading processing can be performed with a speed higher than that of a system that performs the pressure-plate-reading scanning twice.

Further, the present invention can be used for a system including a plurality of units (e.g., a computer, an interface device, a reader, a printer, and so forth) and/or an apparatus including a single unit (an image-processing apparatus, a printer, a fax machine, and so forth).

Further, the present invention can also be implemented by a computer (or a central processing unit (CPU) and/or a microprocessing unit (MPU)) reading and executing program code implementing the procedural steps of the flowcharts described in the above-described embodiments from a storage medium storing the program code. In that case, the program code read from the storage medium implements the functions of the above-described embodiments. The program code and the storage medium storing the program code constitute an embodiment of the present invention.

The storage medium provided to supply the program code may be, for example, a floppy (registered trademark) disk, a hard disk, an optical disk, a magneto-optical disk, a compact disk (CD)-read only memory (ROM), a CD-recordable (R), a magnetic tape, a nonvolatile memory card, a ROM, etc.

Further, not only by the computer reading and executing the program code, but also by the computer executing part of or the entire process utilizing an operating system (OS), etc. running on the computer based on instructions of the program code, the functions of the above-described embodiments may be achieved. The latter is also one of embodiments of the present invention.

In another embodiment of the present invention, the program code read from the storage medium may be written into a memory of a function expansion board inserted in the computer and/or a function expansion unit connected to the computer. At that time, the functions of the above-described embodiments are realized by executing part of or the entire process by a CPU, etc. of the function expansion board and/or the function expansion unit based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-330978 filed Dec. 21, 2007 and Japanese Patent Application No. 2008-318563 filed Dec. 15, 2008, which are hereby incorporated by reference herein in their entirety.

What is claimed is:

1. An image-processing apparatus comprising:
    an area sensor unit configured to read image data items corresponding to a plurality of frames from an original image, the image data items having at least one shift corresponding to less than a single pixel;
    a correction unit configured to correct an inclination of each of the image data items acquired through the area-sensor unit;
    a high-resolution conversion unit configured to acquire image data with a resolution higher than a resolution used during data reading by performing interpolation processing by using the corrected image data items;
    a maximum frame number storage unit configured to store data of a maximum number of at least one frame of the image data items acquired through the area sensor unit;
    a resolution setting unit configured to set a resolution used to output the original image;
    a necessary frame number acquisition unit configured to acquire a number of at least one frame necessary to perform the high resolution conversion based on a result of the setting made by the resolution determining unit;
    a read frequency calculation unit configured to calculate a frequency of reading the original image through the necessary frame number acquisition unit and the maximum frame number storage unit; and
    a read frequency control unit configured to read the frequency determined by the read frequency calculation unit and the original image.

2. The image processing apparatus according to claim 1, wherein, when the read frequency calculation unit determines that it is necessary to read the original image a plurality of times, a frequency of remaining reading determined to be necessary is displayed on a user interface.

3. The image processing apparatus according to claim 1, wherein, when reading which is to be performed with the calculated frequency is stopped, the high resolution conversion is executed by using image data read before the reading is stopped.

4. The image processing apparatus according to claim 1, wherein the area sensor unit includes:
    a first read unit in which the original image is fixed onto an original plate and a light source is moved so that the original image is read; and
    a second read unit in which the light source is fixed and the original image is moved so that the original image is read, and
    a read control unit configured to perform control so that when a value of the calculated reading frequency is two or more, the original image is read by using the first and second read units, and when the value of the calculated reading frequency is not two or more, the original image is read by using either the first read unit or the second read unit.

5. The image processing apparatus according to claim 2, wherein the area sensor unit includes:
    a first read unit in which the original image is fixed onto an original plate and a light source is moved so that the original image is read; and
    a second read unit in which the light source is fixed and the original image is moved so that the original image is read, and a read control unit configured to perform control so that when a value of the calculated reading frequency is two or more, the original image is read by using the first and second read units, and when the value of the calculated reading frequency is not two or more, the original image is read by using either the first read unit or the second read unit.

6. The image processing apparatus according to claim 3, wherein the area sensor unit includes:
   a first read unit in which the original image is fixed onto an original plate and a light source is moved so that the original image is read; and
   a second read unit in which the light source is fixed and the original image is moved so that the original image is read, and
   a read control unit configured to perform control so that when a value of the calculated reading frequency is two or more, the original image is read by using the first and second read units, and when the value of the calculated reading frequency is not two or more, the original image is read by using either the first read unit or the second read unit.

7. The image-processing apparatus according to claim 1, wherein a read area of the area sensor is divided into an arbitrary number of areas and the original image is read for each of the areas.

8. The image-processing apparatus according to claim 2, wherein a read area of the area sensor is divided into an arbitrary number of areas and the original image is read for each of the areas.

9. The image-processing apparatus according to claim 3, wherein a read area of the area sensor is divided into an arbitrary number of areas and the original image is read for each of the areas.

10. The image-processing apparatus according to claim 4, wherein a read area of the area sensor is divided into an arbitrary number of areas and the original image is read for each of the areas.

11. The image-processing apparatus according to claim 5, wherein a read area of the area sensor is divided into an arbitrary number of areas and the original image is read for each of the areas.

12. The image-processing apparatus according to claim 6, wherein a read area of the area sensor is divided into an arbitrary number of areas and the original image is read for each of the areas.

13. An image processing method used in an image processing apparatus including:
   an area sensor unit configured to read image data items corresponding to a plurality of frames from an original image, the image data items having at least one shift corresponding to less than a single pixel;
   a correction unit configured to correct an inclination of each of the image data items acquired through the area-sensor unit; and
   a high resolution conversion unit configured to acquire image data with a resolution higher than a resolution used during data reading by performing interpolation processing by using the corrected image data items, the image-processing method comprising:
   a maximum frame number storage step provided to store data of a maximum number of at least one frame of the image data items acquired through the area sensor unit;
   a resolution setting step provided to set a resolution used to output the original image;
   a necessary frame number acquisition step provided to acquire a number of at least one frame necessary to perform the high resolution conversion based on a result of the setting made at the resolution determining step;
   a read frequency calculation step provided to calculate a frequency of reading the original image through the necessary frame number acquisition step and the maximum frame number storage step; and
   a read frequency control step provided to read the frequency determined at the read frequency calculation step and the original image.

14. The image processing method according to claim 13, wherein, when it is determined that reading the original image a plurality of times is necessary at the read frequency calculation step, a frequency of remaining reading determined to be necessary is displayed on a user interface.

15. The image processing method according to claim 13, wherein, when reading which is to be performed with the calculated frequency is stopped, the high resolution conversion is executed by using image data read before the reading is stopped.

16. The image processing method according to claim 13, wherein the area sensor unit includes:
   a first read unit in which the original image is fixed onto an original plate and a light source is moved so that the original image is read; and
   a second read unit in which the light source is fixed and the original image is moved so that the original image is read, and
   a read control unit configured to perform control so that when a value of the calculated reading frequency is two or more, the original image is read by using the first and second read units, and when the value of the calculated reading frequency is not two or more, the original image is read by using either the first read unit or the second read unit.

17. The image processing apparatus according to claim 14, wherein the area sensor unit includes:
   a first read unit in which the original image is fixed onto an original plate and a light source is moved so that the original image is read; and
   a second read unit in which the light source is fixed and the original image is moved so that the original image is read, and
   a read control unit configured to perform control so that when a value of the calculated reading frequency is two or more, the original image is read by using the first and second read units, and when the value of the calculated reading frequency is not two or more, the original image is read by using either the first read unit or the second read unit.

18. The image processing apparatus according to claim 15, wherein the area sensor unit includes:
   a first read unit in which the original image is fixed onto an original plate and a light source is moved so that the original image is read; and
   a second read unit in which the light source is fixed and the original image is moved so that the original image is read, and
   a read control unit configured to perform control so that when a value of the calculated reading frequency is two or more, the original image is read by using the first and second read units, and when the value of the calculated reading frequency is not two or more, the original image is read by using either the first read unit or the second read unit.

19. The image-processing method according to claim 13, wherein a read area of the area sensor is divided into an arbitrary number of areas and the original image is read for each of the areas.

20. The image-processing method according to claim 14, wherein a read area of the area sensor is divided into an arbitrary number of areas and the original image is read for each of the areas.

21. The image-processing method according to claim 15, wherein a read area of the area sensor is divided into an arbitrary number of areas and the original image is read for each of the areas.

22. The image-processing method according to claim 16, wherein a read area of the area sensor is divided into an arbitrary number of areas and the original image is read for each of the areas.

23. The image-processing method according to claim 17, wherein a read area of the area sensor is divided into an arbitrary number of areas and the original image is read for each of the areas.

24. The image-processing method according to claim 18, wherein a read area of the area sensor is divided into an arbitrary number of areas and the original image is read for each of the areas.

25. An image-processing apparatus comprising:
an area sensor unit including a plurality of sensors including a first sensor and a second sensor adjacent to the first sensor, where the first and second sensors are arranged so that a first read position of the first sensor, where an original image is read at the first read position, is shifted from a second read position of the second sensor, where the original image is read at the second read position, by as much as less than a single pixel;
a high resolution conversion unit configured to acquire image data with a resolution higher than a resolution used during the reading time by performing interpolation processing by using image data items corresponding to a plurality of frames, the image data items being read through the area sensor unit;
a maximum frame number storage unit configured to store data of a maximum number of at least one frame of the image data items acquired through the area sensor unit;
a resolution setting unit configured to set a resolution used to output the original image;
a necessary frame number acquisition unit configured to acquire a number of at least one frame of image data necessary to perform the high resolution conversion based on a result of the setting made by the resolution determining unit;
a read frequency calculation unit configured to calculate a frequency of reading the original image through the necessary frame number acquisition unit and the maximum frame number storage unit; and
a read frequency control unit configured to read the frequency determined by the read frequency calculation unit and the original image.

26. An image processing method used in an image processing apparatus including:
an area sensor unit including a plurality of sensors including a first sensor and a second sensor adjacent to the first sensor, where the first and second sensors are arranged so that a first read position of the first sensor, where an original image is read at the first read position, is shifted from a second read position of the second sensor, where the original image is read at the second read position, by as much as less than a single pixel; and
a high resolution conversion unit configured to acquire image data with a resolution higher than a resolution used during the reading time by performing interpolation processing by using image data items corresponding to a plurality of frames, the image data items being read through the area sensor unit, the image-processing method comprising:
a maximum frame number storage step provided to store data of a maximum number of at least one frame of the image data items acquired through the area sensor unit;
a resolution setting step provided to set a resolution used to output the original image;
a necessary frame number acquisition step provided to acquire a number of at least one frame of image data necessary to perform the high resolution conversion based on a result of the setting made at the resolution determining step;
a read frequency calculation step provided to calculate a frequency of reading the original image through the necessary frame number acquisition step and the maximum frame number storage step; and
a read frequency control step provided to read the frequency determined at the read frequency calculation step and the original image.

27. A program making an image-processing apparatus including:
an area sensor unit configured to read image data items corresponding to a plurality of frames from an original image, the image data items having at least one shift corresponding to less than a single pixel;
a correction unit configured to correct an inclination of each of the image data items acquired through the area-sensor unit; and
a high resolution conversion unit configured to acquire image data with a resolution higher than a resolution which is used during data reading by performing interpolation processing by using the corrected image data items, execute:
a maximum frame number storage step provided to store data of a maximum number of at least one frame of the image data items acquired through the area sensor unit;
a resolution setting step provided to set a resolution used to output the original image;
a necessary frame number acquisition step provided to acquire a number of at least one frame necessary to perform the high resolution conversion based on a result of the setting made at the resolution determining step;
a read frequency calculation step provided to calculate a frequency of reading the original image through the necessary frame number acquisition step and the maximum frame number storage step; and
a read frequency control step provided to read the frequency determined at the read frequency calculation step and the original image.

28. A non-transitory computer readable storage medium storing the program according to claim 27.

* * * * *